United States Patent
Yu et al.

(10) Patent No.: US 11,669,342 B2
(45) Date of Patent: Jun. 6, 2023

(54) PROFILE TRANSMISSION METHOD, RELATED DEVICE, AND STORAGE MEDIUM

(71) Applicant: HUAWEI TECHNOLOGIES CO., LTD., Guangdong (CN)

(72) Inventors: Xiaobo Yu, Shenzhen (CN); Shuiping Long, Beijing (CN); Shunan Fan, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 109 days.

(21) Appl. No.: 16/982,998

(22) PCT Filed: Apr. 25, 2019

(86) PCT No.: PCT/CN2019/084161
§ 371 (c)(1),
(2) Date: Sep. 21, 2020

(87) PCT Pub. No.: WO2019/206201
PCT Pub. Date: Oct. 31, 2019

(65) Prior Publication Data
US 2021/0011737 A1  Jan. 14, 2021

(30) Foreign Application Priority Data
Apr. 25, 2018 (CN) .......................... 201810390590.1

(51) Int. Cl.
*G06F 9/445* (2018.01)
*H04L 67/303* (2022.01)
(52) U.S. Cl.
CPC .......... *G06F 9/4451* (2013.01); *H04L 67/303* (2013.01)

(58) Field of Classification Search
None
See application file for complete search history.

(56) References Cited

U.S. PATENT DOCUMENTS

| 2008/0244747 A1 | 10/2008 | Gleichauf et al. |
| 2013/0013671 A1 | 1/2013 | Relan et al. |
| (Continued) | | |

FOREIGN PATENT DOCUMENTS

| CN | 102346725 A | 2/2012 |
| CN | 103020500 A | 4/2013 |
| (Continued) | | |

OTHER PUBLICATIONS

Iam Smith, Em bedded SIM Remote Provisioning Architecture Version 1.1, GSM Association Official Document SGP.01, Jan. 30, 2014, 86 pages.

*Primary Examiner* — Tonia L Dollinger
*Assistant Examiner* — Jonathan A Sparks
(74) *Attorney, Agent, or Firm* — Womble Bond Dickinson (US) LLP

(57) ABSTRACT

Embodiments of this application disclose a profile transmission method, a related device, and a storage medium, to ensure that a terminal can download a profile to a corresponding OS. This improves accuracy of downloading the profile by the terminal. The method in the embodiments of this application includes: when the terminal runs a first operating system OS, obtaining, by the terminal, a second OS identifier, where the second OS identifier matches a second profile; switching, by the terminal, to a second OS based on the second OS identifier; sending, by the terminal, a target message to a server, where the target message is used to request the second profile; and obtaining, by the terminal, the second profile from the server.

9 Claims, 15 Drawing Sheets

(56) References Cited

U.S. PATENT DOCUMENTS

| | | | | |
|---|---|---|---|---|
| 2013/0031541 A1* | 1/2013 | Wilks | ............ | G06F 8/654 |
| | | | | 717/176 |
| 2016/0088464 A1* | 3/2016 | Hans | ............ | H04W 8/183 |
| | | | | 455/558 |
| 2017/0126872 A1 | 5/2017 | Cha et al. | | |
| 2019/0065749 A1* | 2/2019 | Yang | ............ | G06F 8/65 |
| 2019/0191298 A1* | 6/2019 | Kim | ............ | H04W 12/72 |
| 2019/0310860 A1* | 10/2019 | Vastano | ............ | G06F 8/61 |
| 2019/0364416 A1* | 11/2019 | Dumoulin | ............ | H04W 8/205 |

FOREIGN PATENT DOCUMENTS

| | | |
|---|---|---|
| CN | 104679532 A | 6/2015 |
| CN | 105282732 A | 1/2016 |
| CN | 105722061 A | 6/2016 |
| CN | 106648685 A | 5/2017 |
| CN | 106664521 A | 5/2017 |
| CN | 106851621 A | 6/2017 |
| CN | 107959951 A | 4/2018 |
| JP | 2017076414 A | 4/2017 |
| KR | 20150112197 A | 10/2015 |
| KR | 20170064703 A | 6/2017 |
| WO | 2008121744 A2 | 10/2008 |
| WO | 2017147873 A1 | 9/2017 |

\* cited by examiner

PROFILE TRANSMISSION METHOD, RELATED DEVICE, AND STORAGE MEDIUM

CROSS-REFERENCE TO RELATED APPLICATIONS

This application is a National Stage of International Application No. PCT/CN2019/084161, filed on Apr. 25, 2019, which claims priority to Chinese Patent Application No. 201810390590.1, filed on Apr. 25, 2018. The disclosures of the aforementioned applications are hereby incorporated by reference in their entireties.

TECHNICAL FIELD

This application relates to the terminal field, and in particular, to a profile transmission method, a related device, and a storage medium.

BACKGROUND

Currently, a most common subscriber identification module (SIM) card is a pluggable SIM card. Fixed SIM data is burnt into the SIM card before delivery, the SIM card is connected to an operator network by using the fixed SIM data, and the SIM card and a number resource are changed by inserting and removing the SIM card.

With the development of technologies, an embedded universal integrated circuit card (eUICC), as a next-generation SIM card, has become increasingly popular. The eUICC may enable a user not to be limited to a service of one operator. The user may download a profile for connecting to an operator, without changing the SIM card. A server of the operator determines, based on an eUICC identification (EID), the profile corresponding to the eUICC.

However, if a terminal has operating systems (OS) of a plurality of operators, and profiles running on different OSs are different, the profile determined by the operator server based on the EID may not be a profile that matches an OS currently running on the terminal, which affects accuracy of downloading the profile by the terminal.

SUMMARY

Embodiments of this application provide a profile transmission method, a related device, and a storage medium, to ensure that a terminal can download a profile to a corresponding OS. This improves accuracy of downloading the profile by the terminal.

A first aspect of this application provides a profile profile transmission method. The method includes: when a terminal runs a first operating system OS, obtaining, by the terminal, a second OS identifier, where the second OS identifier matches a second profile; switching, by the terminal, to a second OS based on the second OS identifier; sending, by the terminal, a target message to a server, where the target message is used to request the second profile; and obtaining, by the terminal, the second profile from the server.

In the foregoing manner, a corresponding OS identifier is configured for an OS provided by each operator server. After determining, based on an obtained OS identifier, that a corresponding OS is running, the terminal downloads a profile from a corresponding operator server, to ensure that the terminal can download the profile to the corresponding OS. This improves accuracy of downloading the profile by the terminal.

Optionally, a method for obtaining the second OS identifier by the terminal may be: obtaining, by the terminal, an activation code, where the activation code is generated by the server based on the second OS identifier; and extracting, by the terminal, the second OS identifier from the activation code.

In the foregoing manner, this solution provides a specific implementation in which the terminal obtains the second OS identifier, to improve implementability of this solution.

Optionally, a method for obtaining the second OS identifier by the terminal may be: sending, by the terminal, an OS identifier list and a matching identifier to the server, where there is a unique correspondence between the matching identifier and the second profile; and receiving, by the terminal, the second OS identifier sent by the server, where the second OS identifier is determined by the server from the OS identifier list based on the matching identifier.

In the foregoing manner, this solution provides another specific implementation in which the terminal obtains the second OS identifier, to improve flexibility of this solution.

Optionally, after the terminal obtains the second profile from the server, the terminal sends the second OS identifier to the server; and when the server stores remote profile management RPM information corresponding to the second OS identifier, the terminal obtains the RPM information from the server, where the RPM information is used to manage the second profile.

The foregoing manner can implement that the RPM information determined by the server is based on the OS currently running on the terminal. This improves accuracy and security of RPM.

A second aspect of this application provides a profile profile transmission method. The method includes: receiving, by a server, a target message sent by a terminal, where the target message is generated after the terminal switches to a second OS based on a second OS identifier, the second OS identifier is obtained when the terminal runs a first OS, and the second OS identifier matches a second profile; determining, by the server, the second profile based on the target message; and sending, by the server, the second profile to the terminal.

In the foregoing manner, a corresponding OS identifier is configured for an OS provided by each operator server. After determining, based on an obtained OS identifier, that a corresponding OS is running, the terminal downloads a profile from a corresponding operator server, to ensure that the terminal can download the profile to the corresponding OS. This improves accuracy of downloading the profile by the terminal.

Optionally, before the server receives the target message sent by the terminal, the server generates an activation code based on the second OS identifier.

Optionally, before the server receives the target message sent by the terminal, the server receives an OS identifier list and a matching identifier that are sent by the terminal, where there is a unique correspondence between the matching identifier and the second profile; and the server determines the second OS identifier from the OS identifier list based on the matching identifier, and sends the second OS identifier to the terminal.

Optionally, after the server sends the second profile to the terminal, the server receives the second OS identifier sent by the terminal; and when the server stores remote profile management RPM information corresponding to the second OS identifier, the server sends the RPM information to the terminal, where the RPM information is used to manage the second profile.

A third aspect of this application provides a bundle bundle transmission method. The method includes: sending, by a terminal, a first message to a server, where the first message is used to request a bundle from the server, and the bundle includes an operating system OS file and a profile profile; receiving, by the terminal, a bundle identifier sent by the server; and when the bundle identifier matches a rules authorization table RAT preset on the terminal, obtaining, by the terminal, the OS file and the profile from the server.

In the foregoing manner, the terminal may download, from the server at a time, the bundle including the OS file and the profile, where the OS file matches the profile, which improves efficiency of downloading and installing the OS file and the profile by the terminal.

Optionally, before the terminal receives the bundle identifier sent by the server, the terminal sends a bundle identifier list to the server, where the bundle identifier is determined by the server based on the bundle identifier list.

Optionally, a method for obtaining, by the terminal, the OS file and the profile from the server may be: downloading, by the terminal, the OS file from the server to a first security domain, where the first security domain is configured by the server; and downloading, by the terminal, the profile from the server to a second security domain, where the second security domain is configured by the server.

A fourth aspect of this application provides a bundle bundle transmission method. The method includes: receiving, by a server, a first message sent by a terminal, where the first message is used to request a bundle from the server, and the bundle includes an operating system OS file and a profile profile; sending, by the server, a bundle identifier to the terminal; and when the bundle identifier matches a rules authorization table RAT preset on the terminal, sending, by the server, the OS file and the profile to the terminal.

In the foregoing manner, the terminal may download, from the server at a time, the bundle including the OS file and the profile, where the OS file matches the profile, which improves efficiency of downloading and installing the OS file and the profile by the terminal.

Optionally, before the server sends the bundle identifier to the terminal, the server receives a bundle identifier list sent by the terminal; and the server determines the bundle identifier based on the bundle identifier list.

Optionally, a method for sending, by the server, the OS file and the profile to the terminal may be: configuring, by the server, a first security domain and a second security domain; and sending, by the server, the OS file to the first security domain, and sending the profile to the second security domain.

A fifth aspect of this application provides an issuer security domain root ISD-R update method. The method includes: when an embedded universal integrated circuit card eUICC runs a first operating system OS, sending, by the eUICC, first version information of a first issuer security domain root ISD-R corresponding to the first OS to a primary platform PP; when the eUICC runs a second operating system OS, receiving, by the eUICC, the first version information sent by the PP; and if the first version information does not match second version information of a second ISD-R corresponding to the second OS, obtaining, by the eUICC, data information corresponding to the second version information, where the data information is used to update the second ISD-R.

In the foregoing manner, if ISD-R version information on the primary platform is updated, the ISD-R version information is notified to an OS installed on the eUICC, so that an OS that does not update the ISD-R version information may obtain a latest ISD-R data packet from an update server based on latest ISD-R version information, to implement ISD-R compatibility between different OSs and the primary platform.

A sixth aspect of this application provides a profile profile transmission method. The method includes: when a terminal runs a first operating system OS, obtaining, by the terminal, a second OS identifier, where the second OS identifier matches a second profile; obtaining, by the terminal, a key from a second OS, where the second OS is determined by the terminal based on the second OS identifier; sending, by the terminal, the key to a server; and when the server determines that the key is verified successfully, obtaining, by the terminal, the second profile from the server.

A seventh aspect of this application provides a profile profile transmission method. The method includes: receiving, by a server, a key sent by a terminal, where the key is obtained by the terminal from a second OS, the second OS is determined by the terminal based on a second OS identifier, the second OS identifier is obtained when the terminal runs a first OS, and the second OS identifier matches a second profile; and when the server successfully verifies the key, sending, by the server, the second profile to the terminal.

In the foregoing manner, if the terminal needs to download the profile corresponding to the second OS, the terminal does not need to first switch to a system environment of the second OS, and may directly download, based on the first OS, the profile corresponding to the second OS. This improves flexibility of this solution.

An eighth aspect of this application provides a terminal, to specifically implement a function corresponding to the profile profile transmission method provided in the first aspect. The function may be implemented by hardware, or may be implemented by hardware executing a corresponding software program. The hardware and software include one or more unit modules corresponding to the function. The unit module may be software and/or hardware.

In a design, the terminal includes: a first obtaining unit, configured to: when the terminal runs a first operating system OS, obtain a second OS identifier, where the second OS identifier matches a second profile; a switching unit, configured to switch to a second OS based on the second OS identifier; a sending unit, configured to send a target message to a server, where the target message is used to request the second profile; and a second obtaining unit, configured to obtain the second profile from the server.

Optionally, the first obtaining unit includes: an obtaining module, configured to obtain an activation code, where the activation code is generated by the server based on the second OS identifier; and an extraction module, configured to extract the second OS identifier from the activation code.

Optionally, the first obtaining unit includes: a sending module, configured to send an OS identifier list and a matching identifier to the server, where there is a unique correspondence between the matching identifier and the second profile; and a receiving module, configured to receive the second OS identifier sent by the server, where the second OS identifier is determined by the server from the OS identifier list based on the matching identifier.

Optionally, the sending unit is further configured to send the second OS identifier to the server; and the second obtaining unit is further configured to: when the server stores remote profile management RPM information corresponding to the second OS identifier, obtain the RPM information from the server, where the RPM information is used to manage the second profile.

In another design, the terminal includes a memory, one or more processors, and one or more programs. The one or more programs are stored in the memory, and the processor executes the one or more programs to perform all or some operations performed by the terminal in the method provided in the first aspect.

A ninth aspect of this application provides a server, to specifically implement a function corresponding to the profile profile transmission method provided in the second aspect. The function may be implemented by hardware, or may be implemented by hardware executing a corresponding software program. The hardware and software include one or more unit modules corresponding to the function. The unit module may be software and/or hardware.

In a design, the server includes: a receiving unit, configured to receive a target message sent by a terminal, where the target message is generated after the terminal switches to a second OS based on a second OS identifier, the second OS identifier is obtained when the terminal runs a first OS, and the second OS identifier matches a second profile; a determining unit, configured to determine the second profile based on the target message; and a sending unit, configured to send the second profile to the terminal.

Optionally, the server further includes: a generation unit, configured to generate an activation code based on the second OS identifier.

Optionally, the receiving unit is further configured to receive an OS identifier list and a matching identifier that are sent by the terminal, where there is a unique correspondence between the matching identifier and the second profile; the determining unit is further configured to determine the second OS identifier from the OS identifier list based on the matching identifier; and the sending unit is further configured to send the second OS identifier to the terminal.

Optionally, the receiving unit is further configured to receive the second OS identifier sent by the terminal; and the sending unit is further configured to: when the server stores remote profile management RPM information corresponding to the second OS identifier, send the RPM information to the terminal, where the RPM information is used to manage the second profile.

In another design, the server includes a memory, one or more processors, and one or more programs. The one or more programs are stored in the memory, and the processor executes the one or more programs to perform all or some operations performed by the server in the method provided in the second aspect.

A tenth aspect of this application provides a terminal, to specifically implement a function corresponding to the bundle bundle transmission method provided in the third aspect. The function may be implemented by hardware, or may be implemented by hardware executing a corresponding software program. The hardware and software include one or more unit modules corresponding to the function. The unit module may be software and/or hardware.

In a design, the terminal includes: a sending unit, configured to send a first message to a server, where the first message is used to request a bundle from the server, and the bundle includes an operating system OS file and a profile profile; a receiving unit, configured to receive a bundle identifier sent by the server; and an obtaining unit, configured to: when the bundle identifier matches a rules authorization table RAT preset on the terminal, obtain the OS file and the profile from the server.

Optionally, the sending unit is further configured to send a bundle identifier list to the server, where the bundle identifier is determined by the server based on the bundle identifier list.

Optionally, the obtaining unit includes: a first downloading module, configured to download the OS file from the server to a first security domain, where the first security domain is configured by the server; and a second downloading module, configured to download the profile from the server to a second security domain, where the second security domain is configured by the server.

In another design, the server includes a memory, one or more processors, and one or more programs. The one or more programs are stored in the memory, and the processor executes the one or more programs to perform all or some operations performed by the terminal in the method provided in the third aspect.

An eleventh aspect of this application provides a server, to specifically implement a function corresponding to the bundle bundle transmission method provided in the fourth aspect. The function may be implemented by hardware, or may be implemented by hardware executing a corresponding software program. The hardware and software include one or more unit modules corresponding to the function. The unit module may be software and/or hardware.

In a design, the server includes: a receiving unit, configured to receive a first message sent by a terminal, where the first message is used to request a bundle from the server, and the bundle includes an operating system OS file and a profile; a first sending unit, configured to send a bundle identifier to the terminal; and a second sending unit, configured to: when the bundle identifier matches a rules authorization table RAT preset on the terminal, send the OS file and the profile to the terminal.

Optionally, the receiving unit is further configured to receive a bundle identifier list sent by the terminal; and the server further includes: a determining unit, configured to determine the bundle identifier based on the bundle identifier list.

Optionally, the second sending unit includes: a configuration module, configured to configure a first security domain and a second security domain; and a sending module, configured to send the OS file to the first security domain, and send the profile to the second security domain.

In another design, the server includes a memory, one or more processors, and one or more programs. The one or more programs are stored in the memory, and the processor executes the one or more programs to perform all or some operations performed by the server in the method provided in the fourth aspect.

A twelfth aspect of this application provides an eUICC, to specifically implement a function corresponding to the ISD-R update method provided in the fifth aspect. The function may be implemented by hardware, or may be implemented by hardware executing a corresponding software program. The hardware and software include one or more unit modules corresponding to the function. The unit module may be software and/or hardware.

In a design, the eUICC includes: a sending unit, configured to: when the eUICC runs a first operating system OS, send first version information of a first issuer security domain root ISD-R corresponding to the first OS to a primary platform PP; a receiving unit, configured to: when the eUICC runs a second operating system OS, receive the first version information sent by the PP; and an obtaining unit, configured to: if the first version information does not match second version information of a second ISD-R corresponding to the second OS, obtain data information corresponding to the second version information, where the data information is used to update the second ISD-R.

In another design, the eUICC includes a memory, one or more processors, and one or more programs. The one or more programs are stored in the memory, and the processor executes the one or more programs to perform all or some operations performed by the eUICC in the method provided in the fifth aspect.

A thirteenth aspect of this application provides a terminal, to specifically implement a function corresponding to the profile profile transmission method provided in the sixth aspect. The function may be implemented by hardware, or may be implemented by hardware executing a corresponding software program. The hardware and software include one or more unit modules corresponding to the function. The unit module may be software and/or hardware.

In a design, the terminal includes: a first obtaining unit, configured to: when the terminal runs a first operating system OS, obtain a second OS identifier, where the second OS identifier matches a second profile; a second obtaining unit, configured to obtain a key from a second OS, where the second OS is determined by the terminal based on the second OS identifier; a sending unit, configured to send the key to a server; and a third obtaining unit, configured to: when the server determines that the key is verified successfully, obtain the second profile from the server.

In another design, the terminal includes a memory, one or more processors, and one or more programs. The one or more programs are stored in the memory, and the processor executes the one or more programs to perform all or some operations performed by the terminal in the method provided in the sixth aspect.

A fourteenth aspect of this application provides a terminal server, to specifically implement a function corresponding to the profile profile transmission method provided in the seventh aspect. The function may be implemented by hardware, or may be implemented by hardware executing a corresponding software program. The hardware and software include one or more unit modules corresponding to the function. The unit module may be software and/or hardware.

In a design, the server includes: a receiving unit, configured to receive a key sent by a terminal, where the key is obtained by the terminal from a second OS, the second OS is determined by the terminal based on a second OS identifier, the second OS identifier is obtained when the terminal runs a first OS, and the second OS identifier matches a second profile; and a sending unit, configured to: when the server successfully verifies the key, send the second profile to the terminal.

In another design, the server includes a memory, one or more processors, and one or more programs. The one or more programs are stored in the memory, and the processor executes the one or more programs to perform all or some operations performed by the server in the method provided in the seventh aspect.

A fifteenth aspect of this application provides a computer-readable storage medium. The computer-readable storage medium stores an instruction, and when the instruction is run on a computer, the computer is enabled to perform the method according to any one of the first to the seventh aspects.

According to the foregoing technical solutions, it can be learned that the embodiments of this application have the following advantages.

In this embodiment of this application, when the terminal runs the first operating system OS. The terminal obtains the second OS identifier, where the second OS identifier matches the second profile. Then, the terminal switches to the second OS based on the second OS identifier, and sends the target message to the server, where the target message is used to request the second profile from the server. Further, the terminal obtains the second profile from the server. It can be learned from the foregoing manner that a corresponding OS identifier is configured for an OS provided by each operator server. After determining, based on an obtained OS identifier, that a corresponding OS is running, the terminal downloads a profile from a corresponding operator server, to ensure that the terminal can download the profile to the corresponding OS. This improves accuracy of downloading the profile by the terminal.

DESCRIPTION OF EMBODIMENTS

Embodiments of this application provide a profile transmission method, a related device, and a storage medium, to ensure that a terminal can download a profile to a corresponding OS. This improves accuracy of downloading the profile by the terminal.

In the specification, claims, and accompanying drawings of this application, the terms "first", "second", "third", "fourth", and so on (if existent) are intended to distinguish between similar objects but do not necessarily indicate a specific order or sequence. It should be understood that data termed in such a way are interchangeable in proper circumstances so that the embodiments described herein can be implemented in other orders than the order illustrated or described herein. Moreover, the terms "include", "have" and any other variants mean to cover the non-exclusive inclusion, for example, a process, method, system, product, or device that includes a list of operations or units is not necessarily limited to those operations or units, but may include other operations or units not expressly listed or inherent to such a process, method, system, product, or device.

Figure 1:
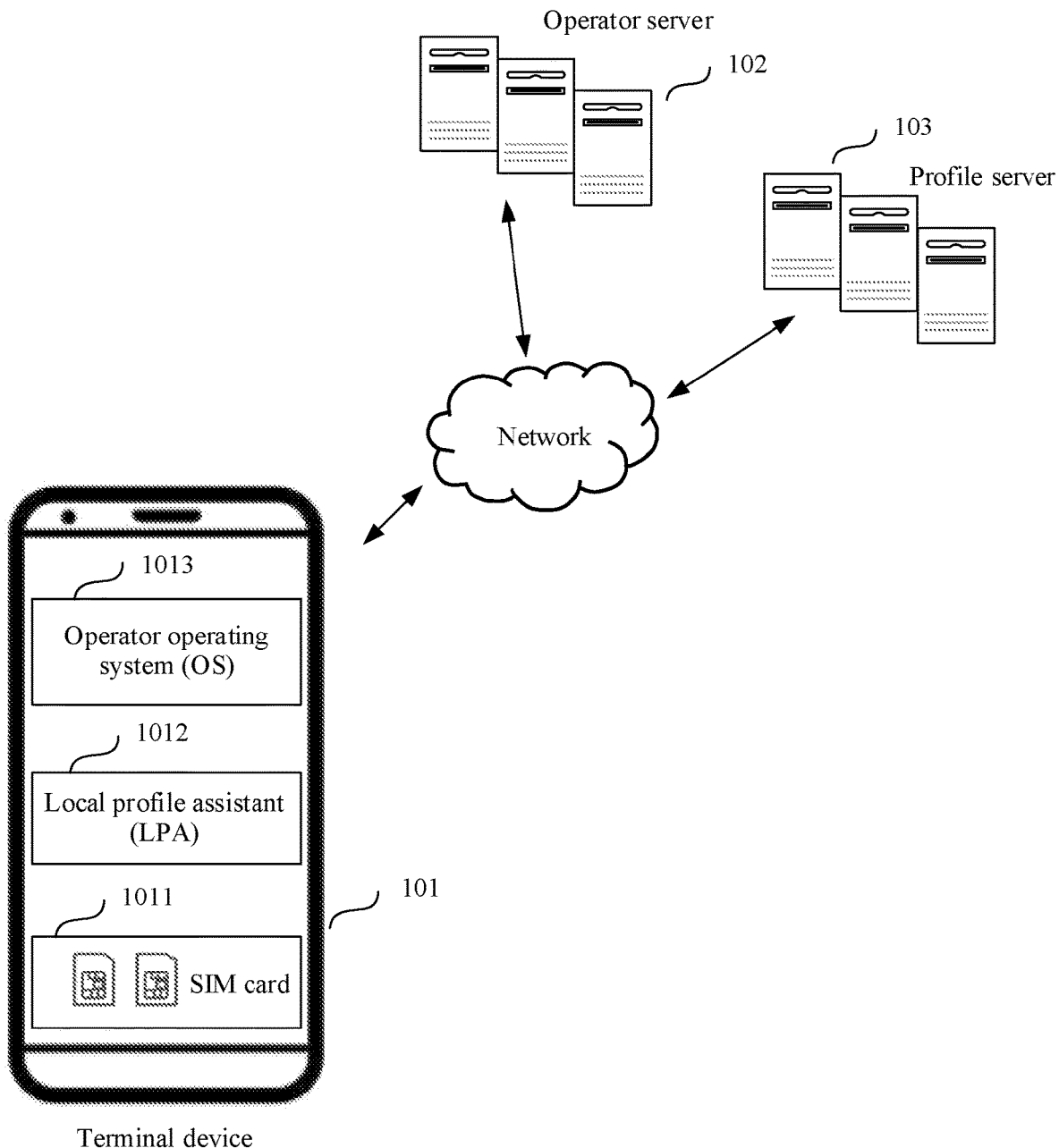
FIG. 1 is a schematic diagram of information exchange between a terminal and a network according to an embodiment of this application.

The embodiments of this application may be applied to a system architecture in which an eUICC is remotely managed. Referring to FIG. 1, a terminal device 101 exchanges information with a server such as an operator server 102 and a profile server 103 through a network. The terminal device (briefly referred to as a terminal) may include user equipment, an internet of vehicles device, a wearable device, an internet of things device, a smart robot device, and the like that exist in various forms, for example, a device such as a mobile phone, a tablet, a smart watch, a vehicle-mounted terminal, a smart water meter, or a smart meter. The terminal device includes software and hardware modules such as a SIM card 1011, a local profile assistant (LPA) 1012, and an operator operating system (OS) 1013. Functions of entities and modules in FIG. 1 are described as follows.

The profile in the embodiments of this application is a general term of a series of files and data that are related to an operator and that are stored and run in the eUICC. The profile includes user identification information and service subscription information. User identification information includes information such as a user identity, an authentication parameter, an operator-customized parameter, an application, a file system, and profile metadata.

The SIM card in the terminal device is an eUICC. The eUICC may also be referred to as an eSIM, and is a secure element that can be used by a plurality of communications operators to remotely manage a subscriber. The eUICC may be placed in the terminal in two manners: a plug-in manner and a welding manner. A user may download a profile required for connecting to an operator, and use the profile in the eUICC to access a selected operator network. The eUICC interacts with the terminal by using an ISO protocol and a 7816 interface protocol related to an IC card.

For example, the LPA may be configured to perform profile download management and service discovery, and provide a UI interface (for example, a profile installation list) for the user, so that the user can manage the local profile of the eUICC (for example, perform an operation such as activation, deactivation, deletion, or unlocking on the profile). In addition, the terminal device may further retrieve an eUICC identification (EID) and/or an integrated circuit card ID (ICCID) by using an LPA module. The LPA module may be a virtual logical module, or may be an entity module, for example, a field programmable gate array. The LPA provides a local discovery service (LDS), local profile download (LPD), and a local user interface UI interface (LUI). An LPA in the user equipment and an LPA in the eUICC each may include one or more of the LDS, the LPD, and the LUI.

The operator may be a basic operator, for example, an operator such as China Mobile, China Unicom, or France Telecom. Alternatively, a terminal vendor may serve as a service provider; a card vendor may serve as a service provider; an enterprise may serve as a service provider; or a virtual operator may serve as a service provider.

An operator server is a server that is deployed by the operator and that provides a wireless communications service, for example, a mobile network operator (MNO) server, a service platform server provided by the terminal vendor for a terminal of a brand of the terminal vendor, or a service platform server provided by the enterprise for a user of the enterprise.

A profile server may also be referred to as a subscription management server, and may specifically include a subscription management data preparation (SM-DP) server and a subscription management service discovery (SM-DS) server. The SM-DP server includes an SM-DP+ server.

The SM-DP+ server is responsible for generating a profile, associating the profile with a specified eUICC, and downloading the profile to the eUICC. In addition, the SM-DP+ server may further execute a remote management request of the operator, and send the remote management request to the eUICC that downloads and installs the profile of the operator. The eUICC executes the remote management request, to implement remote management, the remote management request includes activation, deactivation, deletion, eUICC status review, profile data update, and the like.

A main function of the SM-DS server is to provide a mechanism that enables the SM-DP+ server to contact the LPA. The LDS in the LPA contacts the SM-DS server to obtain an address of the SM-DP+ server. For example, when the SM-DP+ server has a profile downloaded to the eUICC, the SM-DP+ server registers the address of the SM-DP+ server with the SM-DS server, and when the SM-DP+ server has a remote management request to be sent to the eUICC, the SM-DP+ server registers the address or an event of the SM-DP+ server with the SM-DS server. After obtaining the address or the event of the SM-DP+ server, the LDS may contact the SM-DP+ to download the profile or obtain the remote management request.

An operator OS may be an OS of an eUICC that runs a profile, or may be an OS of a software application (APP) that is installed on a terminal and that is used for the operator to provide a service, for example, an OS of a mobile customer service center APP of an operator, or may be another OS, for example, an OS of a financial industry, an OS developed by a terminal vendor or an OS related to an industry application.

Operator OS software includes an upper layer part and a lower layer part. The upper layer part of the operator OS includes a local profile assistant services (LPA services), a telecom framework, a profile policy enabler, a profile package interpreter, and the like. The lower part of the operator OS includes an issuer security domain root (ISD-R), an eUICC controlling authority security domain (ECASD), an encryption algorithm, and the like.

The ISD-R is mainly used to create a new issuer security domain profile (ISD-P), and is responsible for life cycle management of all ISD-Ps. Each eUICC has only one ISD-R. The ISD-R is installed and personalized by a SIM card manufacturer in an eUICC production process, and the ISD-R cannot be deleted or invalidated.

The ECASD is mainly used to securely store credentials to support a security domain on the eUICC. Each eUICC has only one ECASD. In the eUICC production process, the SIM card manufacturer needs to install and personalize the ECASD.

The ECASD includes:

an eUICC private key, used to establish a signature of the ECDSA;

an eUICC certificate, used for eUICC authentication, where the eUICC certificate includes an eUICC public key;

a public key of a certificate issuer (CI), used to verify a certificate of a network element (for example, SM-DP+) outside the eUICC, where the ECASD may include one or more different public keys;

a certificate of the SIM card manufacturer; and a key set of the SIM card manufacturer, used to update the key and the certificate.

The ECASD may create a signature of the eUICC based on information provided by the ISD-R, and may verify the network element (for example, the SM-DP+) outside the eUICC by using the public key of the CI.

In this embodiment of this application, the terminal may simultaneously install operating systems of a plurality of different operators, for example, a first OS of China Unicom and a second OS of China Mobile. If the terminal needs to download a profile provided by China Mobile, the terminal needs to currently run the second OS of China Mobile, which ensures that the profile provided by the operator can be downloaded to the operating system of the operator. The following provides detailed descriptions.

Figure 2:
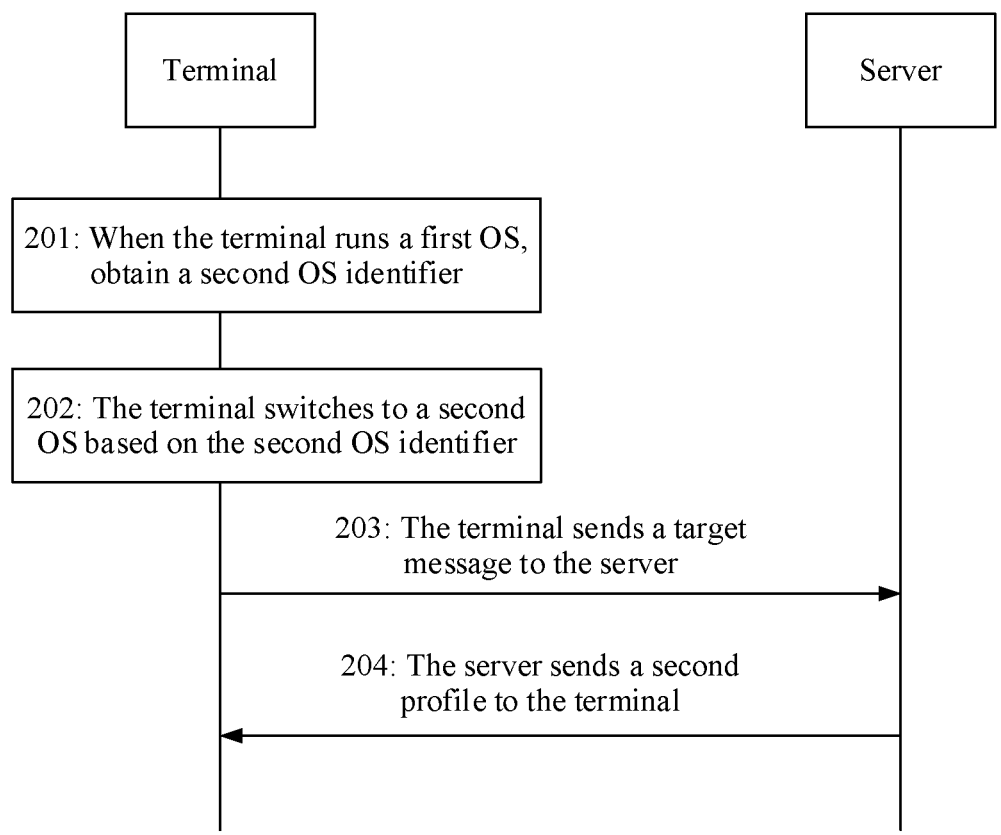
FIG. 2 is a schematic diagram of an embodiment of a profile transmission method according to this application.

Referring to FIG. 2, a profile transmission method in an embodiment of this application includes the following operations.

201: When the terminal runs the first OS, obtain a second OS identifier.

In this embodiment of this application, OSs of at least two different operators are installed on the eUICC of the terminal. When the terminal runs the first OS, the terminal obtains a second OS identifier that matches a second profile, where a first profile is installed on the first OS.

It may be understood that the first profile provided by a first operator needs to run the first OS, and a second profile provided by a second operator needs to run the second OS.

Optionally, the terminal interacts with the SM-DP+ server of the second operator by using the LPA.

Optionally, the terminal may extract the second OS identifier from an activation code generated by the server. For example, the server may generate, based on the second OS identifier, a two-dimensional code including the second OS identifier, and the terminal may obtain the second OS identifier from the server by scanning the two-dimensional code. The second OS identifier may be obtained by the server based on user subscription information when the user subscribes to the service.

Optionally, the terminal may send an OS identifier list and a matching identifier to the server, where there is a unique correspondence between the matching identifier and the second profile. The OS identifier list includes an OS identifier corresponding to each OS installed on the terminal. The server determines, from the OS identifier list based on the matching identifier, the second OS identifier matching the second profile, and sends the second OS identifier to the terminal.

Optionally, the terminal may obtain a bundle identifier that includes the second OS identifier and the second profile identifier.

Optionally, a format of the second OS identifier may be a combination of an operator identifier, a country code, an OS version number, and the like.

202: The terminal switches to the second OS based on the second OS identifier.

Because the terminal currently runs the first OS, after receiving the second OS identifier, the terminal switches to the second OS based on the second OS identifier, so that the terminal runs the second OS.

203: The terminal sends a target message to the server.

After switching to the second OS, the terminal sends the target message to the server to request to download the second profile. Optionally, the target message sent to the server may carry an indication notifying the server that the terminal has currently run the second OS.

204: The server sends the second profile to the terminal.

The server may find the corresponding second profile based on the second OS identifier, and send the second profile to the terminal. Optionally, the server may send the second profile after learning that the terminal runs the second OS.

In this embodiment of this application, when the terminal runs the first operating system OS. The terminal obtains the second OS identifier, where the second OS identifier matches the second profile. Then, the terminal switches to the second OS based on the second OS identifier, and sends the target message to the server, where the target message is used to request the second profile from the server. Further, the terminal obtains the second profile from the server. It can be learned from the foregoing manner that a corresponding OS identifier is configured for an OS provided by each operator server. After determining, based on an obtained OS identifier, that a corresponding OS is running, the terminal downloads a profile from a corresponding operator server, to ensure that the terminal can download the profile to the corresponding OS. This improves accuracy of downloading the profile by the terminal.

The following describes in detail information exchange between the terminal and the server with reference to a specific scenario.

Scenario 1: The terminal obtains the second OS identifier by using the activation code provided by the server.

Figure 3:
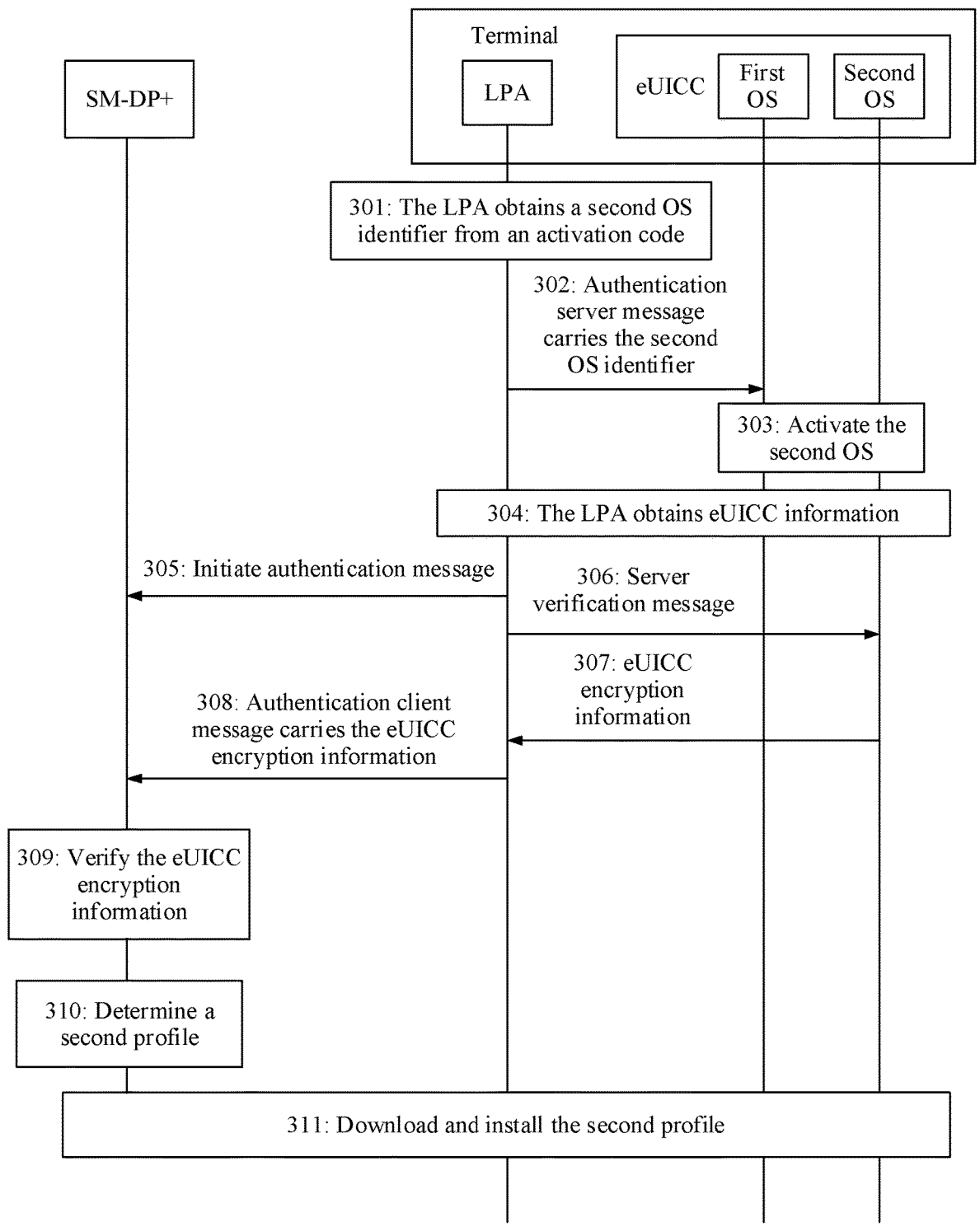
FIG. 3 is a schematic diagram of another embodiment of a profile transmission method according to this application.

Referring to FIG. 3, in this embodiment, the terminal includes an LPA and an eUICC. The first OS and the second OS are installed on the eUICC, and the server is the SM-DP+ server of the second operator. The eUICC may be a security module embedded in a terminal chip, or may be an independent security module.

301: The LPA may obtain the second OS identifier from the activation code provided by a second operator. In addition, the activation code further includes address information of the SM-DP+ server. The activation code may be the two-dimensional code provided by the second operator, and the two-dimensional code includes information about the second OS identifier. The second OS identifier may be obtained by the LPA by scanning the two-dimensional code and parsing the two-dimensional code.

302: The LPA sends an authentication server message to the eUICC, where the authentication server message includes the second OS identifier and the matching identifier. The matching ID may be used to index data in the server. For example, the matching ID may be an activation code token or an event identifier event ID. The activation code token is used to index a previous subscription relationship on the server. For example, the user subscribes to a server by using a mobile customer service center, and the server generates an associated profile for a subscribed service. For security considerations, to avoid exposing the profile, the activation code token is used to index the profile, so that the terminal obtains the associated profile by using the activation code token.

303: The eUICC activates the second OS based on the received second OS identifier, so that the eUICC runs the second OS. It may be understood that when the eUICC receives the second OS identifier, if the eUICC is running the first OS, the eUICC switches to the second OS; or if the eUICC is running the second OS, the second OS continues running.

304: The LPA obtains, from the eUICC, eUICC information used for authentication with the server, where the eUICC information includes information such as an eUICC challenge and eUICC-related information, and the eUICC information is used for mutual authentication between the server and the terminal to verify the eUICC for security.

305: The LPA sends an initiate authentication message to the SM-DP+ server, where the message includes the eUICC information, the eUICC challenge, and the address information of the SM-DP+ server.

306: The server returns a response message to the LPA, where the message includes information such as a server-related certificate, a transaction identifier, a server challenge, and a server address. After preliminarily verifying the response message, the LPA sends a server verification message to the eUICC.

307: The eUICC verifies the information carried in the received authentication server message. After the verification succeeds, the eUICC sends the eUICC information again, which specifically includes the received transaction identifier, the server challenge, eUICC-related information, the second OS identifier, and the matching identifier. The eUICC encrypts the eUICC information to generate eUICC encryption information, where the eUICC is signed to obtain an eUICC signature, and then the eUICC sends the eUICC encryption information to the LPA.

308: The LPA sends an authentication client message to the SM-DP+ server, where the authentication client message carries the eUICC encryption information. It may be understood that the message is used to request the second profile from the SM-DP+ server.

309: The SM-DP+ server verifies the eUICC encryption information.

310: After verifying the eUICC encryption information, the SM-DP+ server may determine the second profile based on the second OS identifier and the matching identifier.

311: The eUICC downloads and installs the second profile from the SM-DP+ server.

Scenario 2: The server determines the second OS identifier from the OS identifier list reported by the terminal.

Figure 4:
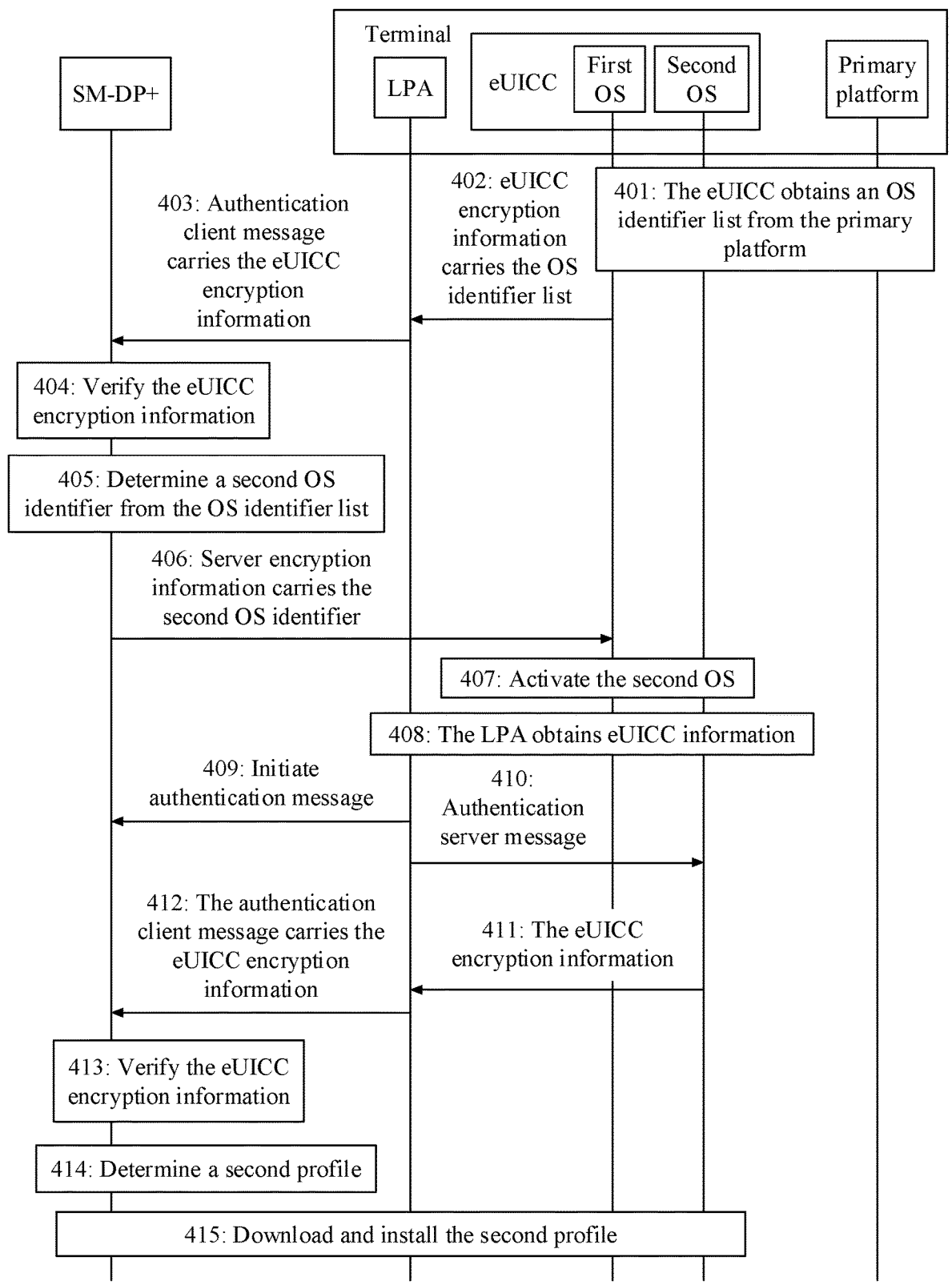
FIG. 4 is a schematic diagram of another embodiment of a profile transmission method according to this application.

Referring to FIG. 4, in this embodiment, the terminal includes an LPA, an eUICC, and a primary platform (PP). The first OS and the second OS are installed on the eUICC, and the server is the SM-DP+ server of the second operator. The primary platform is a hardware platform of the terminal, and further includes a lower layer operating system OS, so that an upper layer OS accesses hardware resources of a lower layer of the primary platform. The eUICC may be a security module embedded in a terminal chip, or may be an independent security module.

401: The eUICC obtains OS identifier list information about an OS installed in the eUICC. Optionally, the eUICC may send, to the primary platform, a message for obtaining the OS identifier list, and the primary platform sends the OS identifier list stored locally to the eUICC, where the OS identifier list includes an OS identifier corresponding to each OS installed on the terminal. The primary platform provides a management module for centrally managing the OSs installed in the eUICC. Optionally, the management module for centrally managing the OSs installed in the eUICC may be further provided on an eUICC platform side.

402: The eUICC sends the eUICC encryption information to the LPA, where the eUICC encryption information includes the OS identifier list and the matching identifier. The OS identifier list and the matching identifier of the eUICC are signed (the eUICC is signed to obtain an eUICC signature) to obtain the eUICC encryption information.

403: The LPA sends the authentication client message to the SM-DP+ server, where the authentication client message carries the eUICC encryption information.

404: The SM-DP+ server verifies the eUICC encryption information.

405: The SM-DP+ server determines the second OS identifier from the OS identifier list based on the matching identifier.

406: The SM-DP+ server sends server encryption information to the eUICC, where the server encryption information includes the second OS identifier.

407: The eUICC activates the second OS based on the received second OS identifier, so that the eUICC runs the second OS. It may be understood that when the eUICC receives the second OS identifier, if the eUICC is running the first OS, the eUICC switches to the second OS; or if the eUICC is running the second OS, the second OS continues running.

408: The LPA obtains, from the eUICC, eUICC information used for authentication with the server, where the eUICC information includes information such as an eUICC challenge and eUICC-related information, and the eUICC information is used for mutual authentication between the server and the terminal to verify the eUICC for security.

409: The LPA sends the initiate authentication message to the SM-DP+ server, where the initiate authentication message includes the eUICC information, the eUICC challenge, and the address information of the SM-DP+ server.

410: The server returns the authentication server message to the LPA, where the message includes information such as a server-related certificate, a transaction identifier, a server challenge, and a server address. After preliminarily verifying the authentication server message, the LPA sends a server verification message to the eUICC.

411: The eUICC verifies the information carried in the received authentication server message. After the verification succeeds, the eUICC sends the eUICC information again, which specifically includes the received transaction identifier, the server challenge, eUICC-related information, the second OS identifier, and the matching identifier. The eUICC encrypts the eUICC information to generate eUICC encryption information, where the eUICC is signed to obtain an eUICC signature, and then the eUICC sends the eUICC encryption information to the LPA.

412: The LPA sends the authentication client message to the SM-DP+ server, where the authentication client message carries the eUICC encryption information.

413: The SM-DP+ server verifies the eUICC encryption information.

414: After verifying the eUICC encryption information, the SM-DP+ server may determine the second profile based on the second OS identifier and the matching identifier.

415: The eUICC downloads and installs the second profile from the SM-DP+ server.

The foregoing describes a scenario in which the terminal downloads the profile to the corresponding OS. After the terminal completes downloading and installation of the profile, the server may remotely manage the profile on the terminal. Details are described below.

Figure 5:
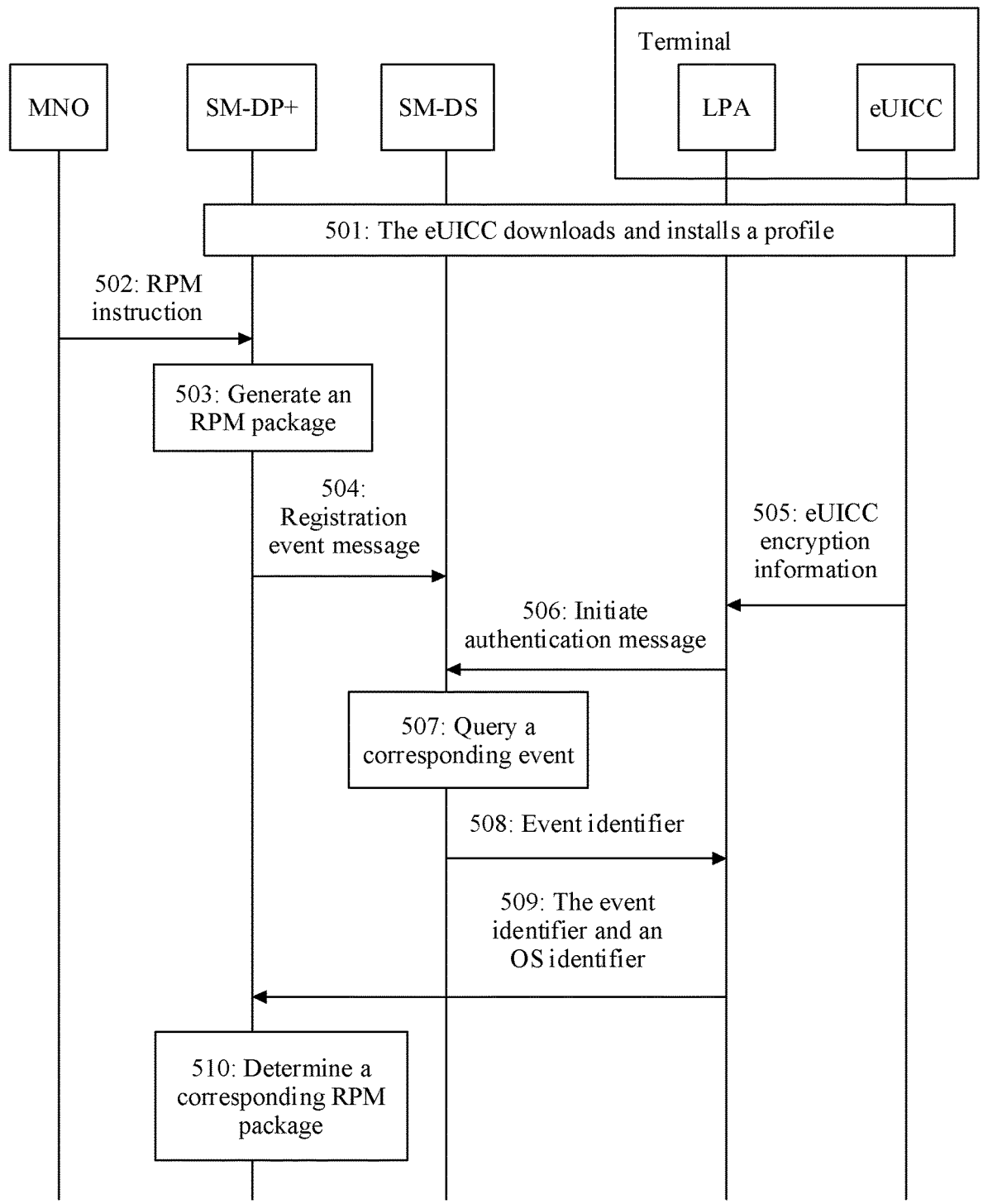
FIG. 5 is a schematic diagram of an embodiment of an RPM method according to this application.

Referring to FIG. 5, in this embodiment, the terminal includes an LPA and an eUICC, and the server includes an MNO server, an SM-DP+ server, and an SM-DS server.

501: The eUICC downloads the profile and installs the profile in a corresponding OS, and the eUICC may obtain a corresponding OS identifier. For a specific process, refer to the description in the embodiment shown in FIG. 3 or FIG. 4. Details are not described herein again.

502: The MNO server sends a remote profile management (RPM) instruction to the SM-DP+ server, where the instruction includes an OS identifier, a matching identifier, an eUICC identifier, and an SM-DS server address.

503: The SM-DP+ server generates an RPM package according to the RPM instruction, where different RPM packages correspond to different events.

504: The SM-DP+ server sends a registration event message to the SM-DS server, where the registration event message includes an eUICC identifier, an OS identifier, an event identifier, and an address of the SM-DP+ server. The LPA periodically obtains its registration event from the SM-DS server.

505: The LPA obtains the eUICC encryption information from the eUICC, where the eUICC encryption information includes an OS identifier and a matching identifier.

506: The LPA sends the initiate authentication message to the SM-DS server, where the message includes the OS identifier.

507: After receiving the OS identifier sent by the LPA, the SM-DS server queries a locally stored OS identifier. If a same OS identifier is locally stored, it indicates that an RPM event corresponding to the eUICC exists.

508: The SM-DS server sends the event identifier corresponding to the RPM event to the LPA.

509: After obtaining the event identifier, the LPA sends the event identifier and the OS identifier to the SM-DP+ server. Specifically, the LPA may send the event identifier and the OS identifier to the SM-DP+ server in a mutual authentication process with the SM-DP+ server.

510: The SM-DP+ server determines a corresponding RPM package based on the event identifier and the OS identifier that are reported by the LPA, so that it can be implemented that the RPM package determined by the SM-DP+ server is based on an OS currently running on the eUICC, thereby improving accuracy and security of the RPM.

The foregoing described embodiments are all based on the scenario in which the OS has been installed on the terminal. In an OS and profile download process, this solution provides a manner of packaging and downloading an OS file and a profile. Details are described below.

Figure 6:
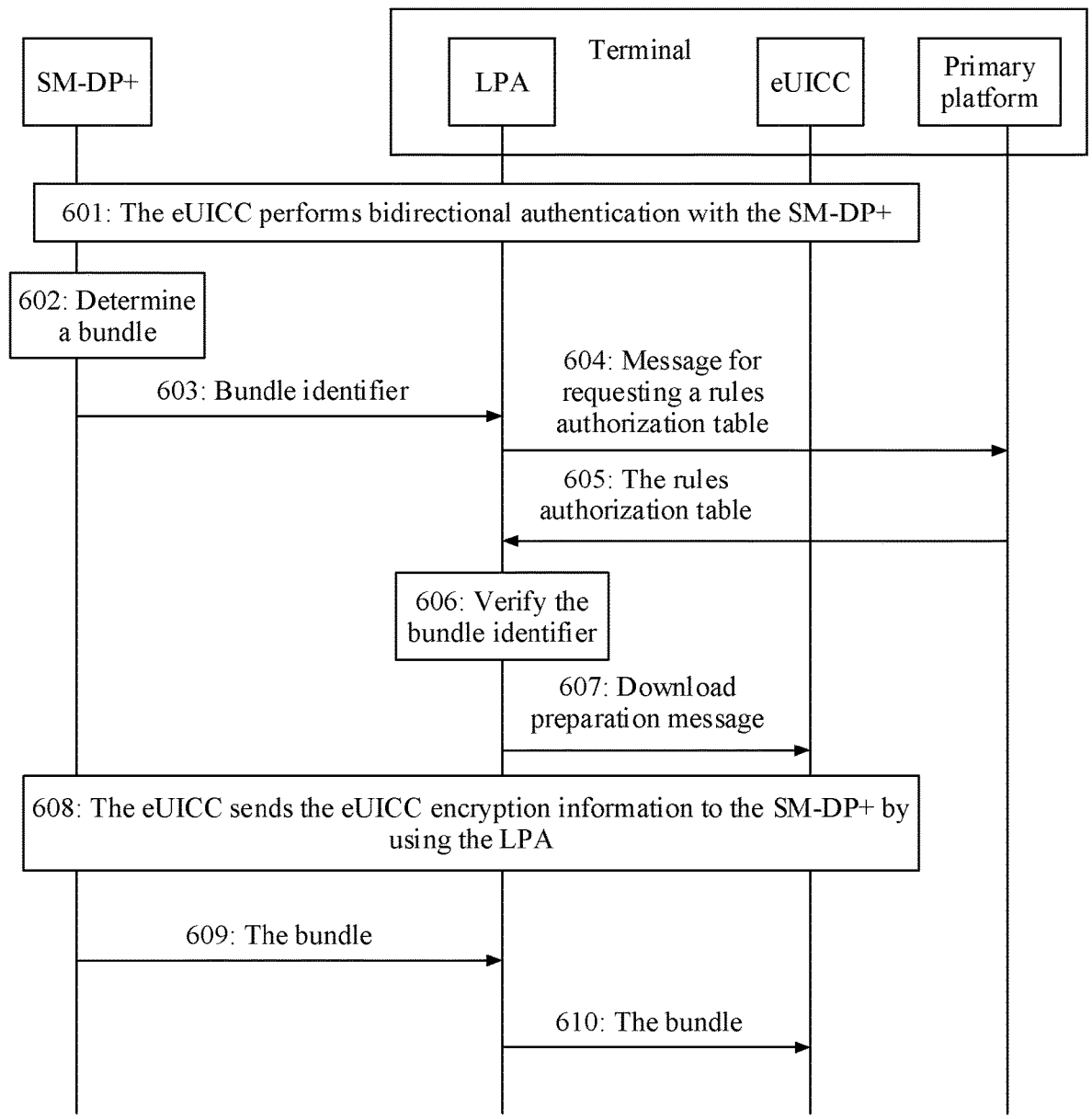
FIG. 6 is a schematic diagram of an embodiment of a bundle transmission method according to this application.

Referring to FIG. 6, in this embodiment, a terminal includes an LPA, an eUICC, and a primary platform (PP), and a server is an SM-DP+ server.

601: The eUICC performs mutual authentication with the SM-DP+ server by using the LPA, and in the mutual authentication process, the eUICC requests a bundle from the SM-DP+ server.

The bundle includes at least a profile and an OS file corresponding to the profile, and may further include another application file (APP). It may be understood that a corresponding bundle identifier is configured for each bundle. The bundle identifier may be obtained by an MNO server based on a subscription procedure with a user, and then the bundle identifier is sent to the SM-DP+server. In addition, the SM-DP+ may also select a corresponding bundle identifier from the bundle identifier list reported by the terminal.

602: The SM-DP+ server may determine the bundle based on a matching identifier obtained in the mutual authentication process. Optionally, the matching identifier may be obtained to determine a profile, and an OS file corresponding to the profile is further determined. Then, the profile and the OS file are bundled to obtain a bundle.

603: The SM-DP+ server sends the bundle identifier to the LPA, where the SM-DP+ server may send, to the LPA, SM-DP+ encryption information that carries the bundle identifier.

604: After receiving the bundle identifier, the LPA may send a message for requesting a rules authorization table (RAT) to the eUICC, or send a message for requesting the RAT to a primary platform. In this embodiment, an example in which the message is sent to the primary platform is used, and the RAT is preconfigured on the primary platform and includes a bundle identifier that corresponds to a bundle and that can be downloaded by the eUICC.

605: The primary platform sends the RAT to the LPA. Optionally, when the RAT is requested from the eUICC, the eUICC returns the RAT to the LPA.

606: The LPA verifies, based on the received RAT, the bundle identifier delivered by the SM-DP+ server, and if a matched bundle identifier is found in the RAT, it indicates that the verification succeeds.

607: After the bundle identifier is successfully verified, the LPA sends a download preparation message to the eUICC, where the message includes the SM-DP+ encryption information.

608: After receiving the download preparation message, the eUICC may generate eUICC encryption information, and send the eUICC encryption information to the SM-DP+ server by using the LPA.

609: After verifying the eUICC encryption information, the SM-DP+ server sends the bundle to the LPA.

610: The LPA loads the bundle, and configures, for the eUICC, an issuer security domain-bundle (ISD-B) used to store the bundle. Specifically, the ISD-B may be further divided into a security domain for storing the OS file and a security domain for storing the profile, and the eUICC may separately download the OS file and the profile to a corresponding security domain.

Optionally, the eUICC may configure the ISD-B in any operation before the operation 609.

In the foregoing description, the profile may be downloaded and installed together with the OS file in a bundle form. When the primary platform is loaded with a plurality of bundles, a problem that version information of an issuer security domain root (ISD-R) of the OS file in the bundle is incompatible with ISD-R version information of the primary platform may occur, and therefore, this embodiment provides an ISD-R update method. Details are described below.

Figure 7:
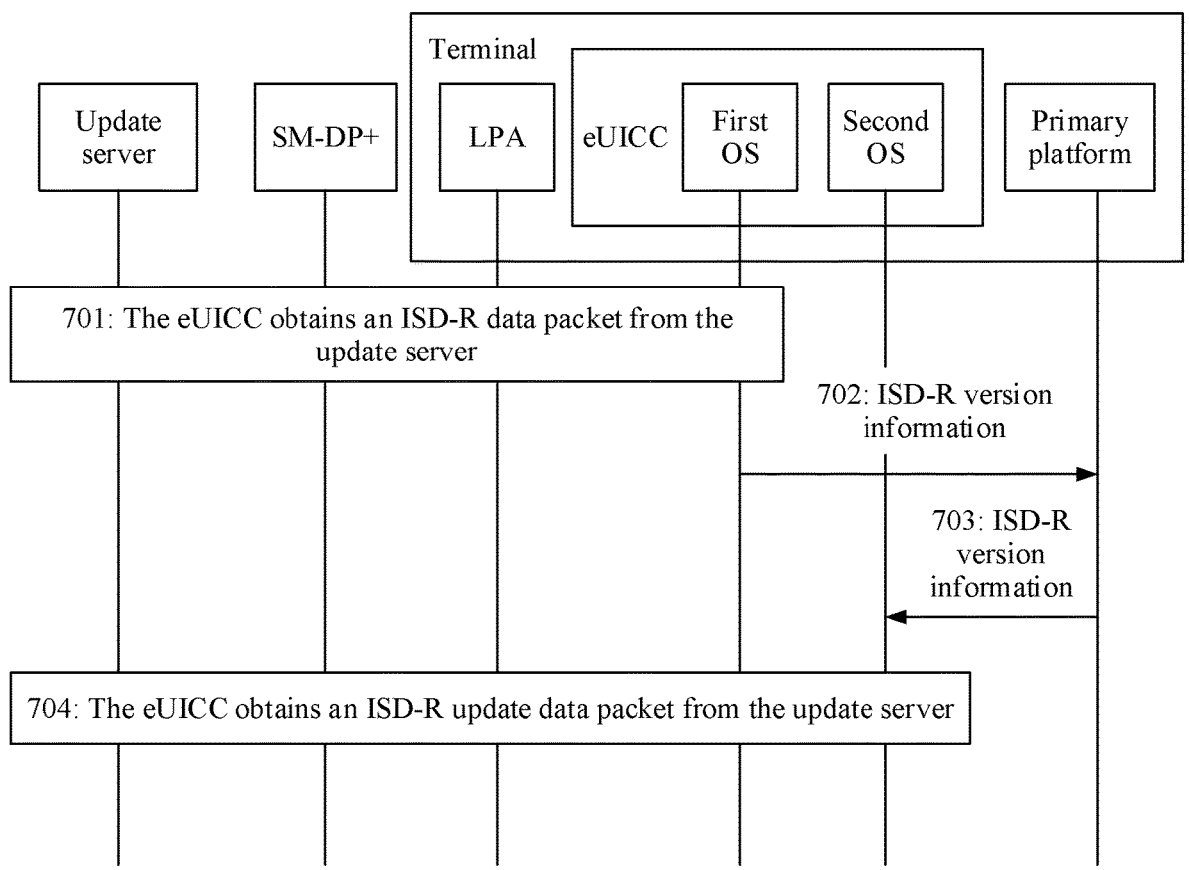
FIG. 7 is a schematic diagram of an embodiment of an ISD-R update method according to this application.

Referring to FIG. 7, in this embodiment, a terminal includes an LPA, an eUICC, and a primary platform (PP). A first OS and a second OS are installed on the eUICC, and a server includes an SM-DP+ server and an update server. The update server may be a function entity in the SD-DP+ server, or an update server deployed by a card manufacturer, a terminal manufacturer, or a chip manufacturer.

701: When the eUICC runs a first OS, the eUICC establishes a connection to the update server by using the LPA, and obtains a latest ISD-R data packet from the update server, to update the ISD-R on the first OS.

702: After the ISD-R on the first OS is updated, the eUICC sends latest ISD-R version information to the primary platform, so that the ISD-R version information on the primary platform is updated. Optionally, when the ISD-R version on the primary platform is earlier than the ISD-R version on the first OS, the primary platform may obtain, based on the received ISD-R version on the first OS, the ISD-R data packet corresponding to the ISD-R version, to update the ISD-R of the primary platform.

703: When the eUICC runs the second OS, the primary platform sends updated ISD-R version information to the eUICC.

704: If ISD-R version information in the second OS does not match the latest ISD-R version information obtained from the primary platform, the eUICC running the second OS establishes a connection to the update server by using the LPA, and obtains the latest ISD-R data packet from the update server, to update the ISD-R on the second OS. The update server may be a same server, or may be different update servers. In this embodiment, a same update server is used as an example.

In this embodiment of this application, if the ISD-R version information on the primary platform is updated, the ISD-R version information is notified to an OS installed on the eUICC, so that an OS that does not update the ISD-R version information may obtain the latest ISD-R data packet from the update server based on the latest ISD-R version information, to implement ISD-R compatibility between different OSs and the primary platform.

A user may subscribe to a plurality of different operators at the same time, that is, operating systems of the plurality of different operators may be installed on the eUICC. If some operating systems are activated, and the other operating systems are not activated, the inactivated operating systems cannot download a corresponding profile over the Internet, and therefore, when the eUICC runs on the activated OS, the eUICC needs to download, from the server, a profile corresponding to the inactivated OS. Details are described below.

Figure 8:
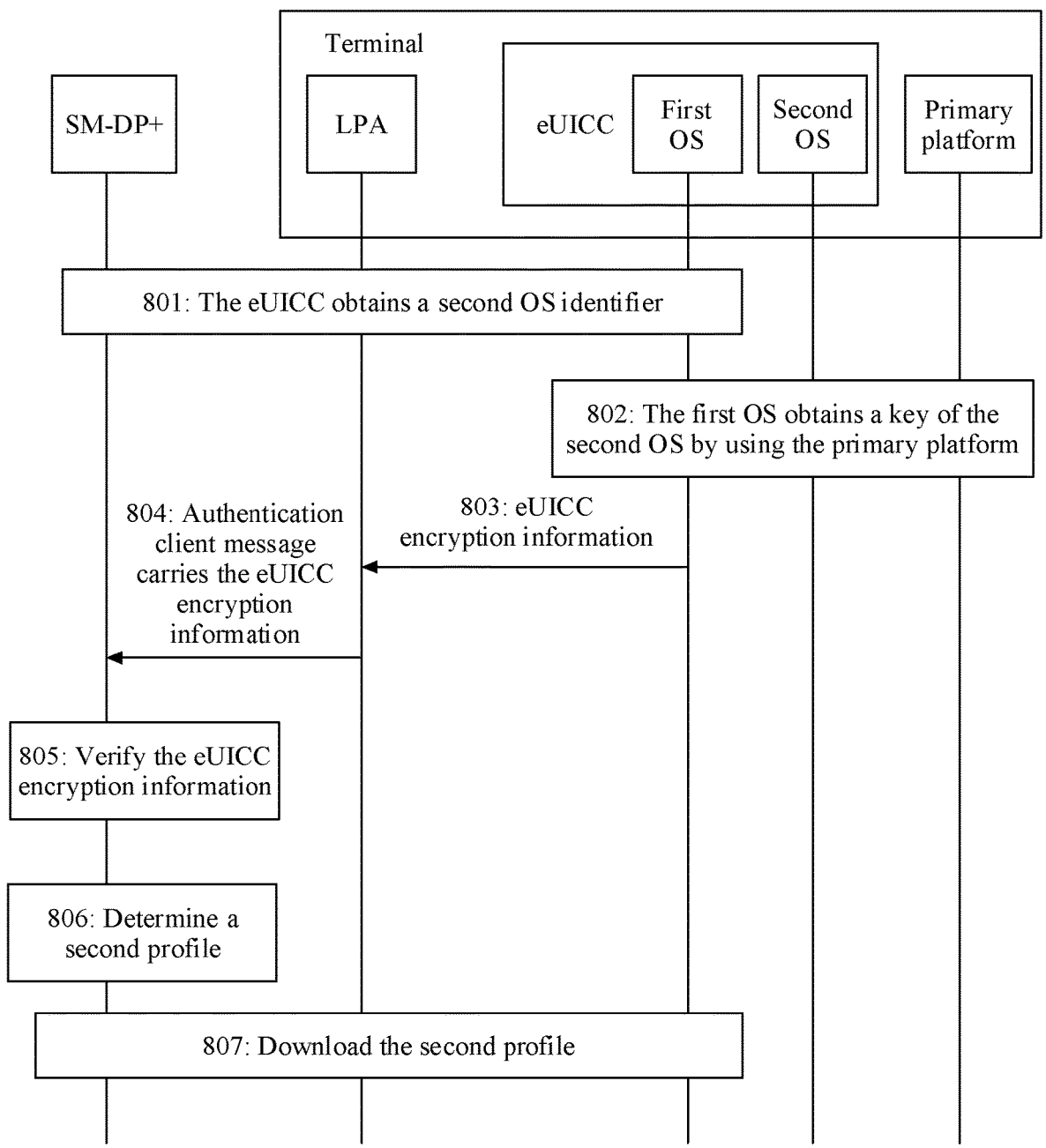
FIG. 8 is a schematic diagram of another embodiment of a profile transmission method according to this application.

Referring to FIG. 8, in this embodiment, the terminal includes the LPA, the eUICC, and the primary platform (PP). The first OS and the second OS are installed on the eUICC, and the server includes the SM-DP+ server.

801: The eUICC running the first OS obtains a second OS identifier. This process is similar to the operation of obtaining the second OS by the eUICC in the embodiment shown in FIG. 3 or FIG. 4. Details are not described herein again.

802: The eUICC may find a corresponding second OS based on the second OS identifier, and then request a key of the second OS from the second OS by using the primary platform, and the primary platform forwards the key of the second OS to the eUICC running the first OS.

803: The eUICC sends eUICC encryption information to the LPA, where the eUICC encryption information includes a matching identifier, a second OS identifier, and a second OS key.

804: The LPA sends the authentication client message to the SM-DP+ server, where the authentication client message carries the eUICC encryption information.

805: The SM-DP+ server verifies the eUICC encryption information. It may be understood that the SM-DP+ server needs to verify the second OS key carried in the eUICC encryption information.

806: After verifying the second OS key, the SM-DP+ server may determine a second profile based on the second OS identifier and the matching identifier.

807: The eUICC running the first OS downloads the second profile from the SM-DP+ server, and may further forward the downloaded second profile to the second OS.

In this embodiment of this application, if the terminal needs to download the profile corresponding to the second OS, the terminal does not need to first switch to a system environment of the second OS, and may directly download, based on the first OS, the profile corresponding to the second OS. This improves flexibility of this solution.

The foregoing describes the method embodiments in the embodiments of this application. The following describes the terminal and the server in the embodiments of this application from a perspective of a function module and from a perspective of hardware implementation.

Figure 9:
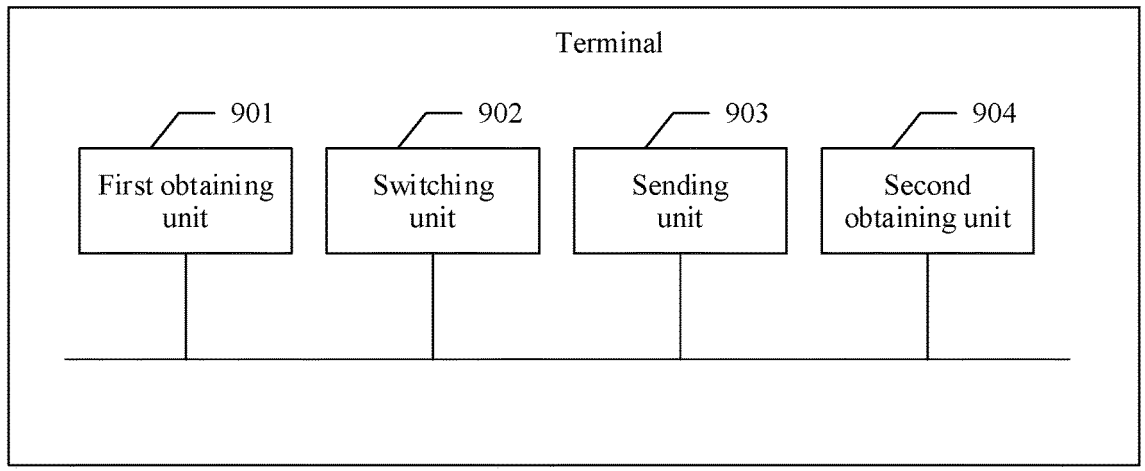
FIG. 9 is a schematic diagram of an embodiment of a terminal according to this application.

As shown in FIG. 9, in an embodiment of a terminal in this application, the terminal includes at least the following function modules:

a first obtaining unit 901, configured to: when the terminal runs a first operating system OS, obtain a second OS identifier, where the second OS identifier matches a second profile;

a switching unit 902, configured to switch to a second OS based on the second OS identifier;

a sending unit 903, configured to send a target message to a server, where the target message is used to request the second profile; and a second obtaining unit 904, configured to obtain the second profile from the server.

In this embodiment of this application, when the terminal runs the first operating system OS, the first obtaining unit 901 obtains the second OS identifier, where the second OS identifier matches the second profile. Then, the switching unit 902 switches to the second OS based on the second OS identifier, and the sending unit 903 sends the target message to the server, where the target message is used to request the second profile from the server. Further, the second obtaining unit 904 obtains the second profile from the server. It can be learned from the foregoing manner that a corresponding OS identifier is configured for an OS provided by each operator server. After determining, based on an obtained OS identifier, that a corresponding OS is running, the terminal downloads a profile from a corresponding operator server, to ensure that the terminal can download the profile to the corresponding OS. This improves accuracy of downloading the profile by the terminal.

Figure 10:
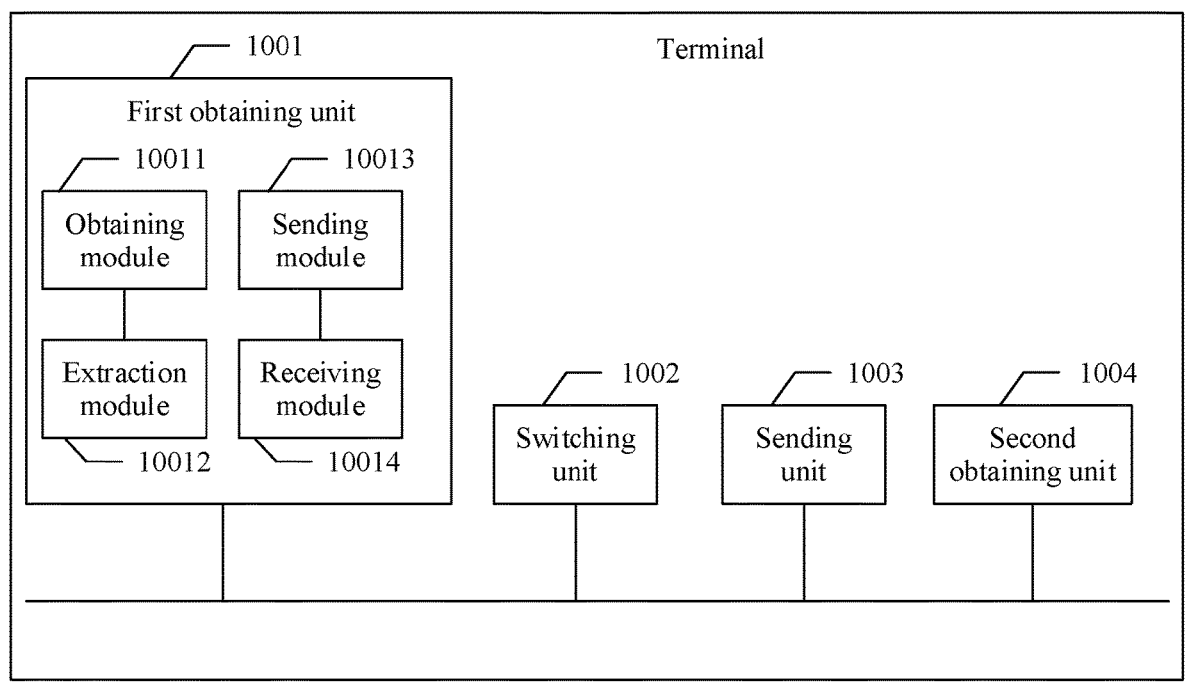
FIG. 10 is a schematic diagram of another embodiment of a terminal according to this application.

As shown in FIG. 10, in some specific embodiments, a first obtaining unit 1001, a switching unit 1002, a sending unit 1003, and a second obtaining unit 1004 are configured. Actions performed by the units are similar to actions performed by the units shown in FIG. 9. Details are not described herein again.

Optionally, the first obtaining unit 1001 includes:
an obtaining module 10011, configured to obtain an activation code, where the activation code is generated by the server based on the second OS identifier; and
an extraction module 10012, configured to extract the second OS identifier from the activation code.

Optionally, the first obtaining unit 1001 includes:
a sending module 10013, configured to send an OS identifier list and a matching identifier to the server, where there is a unique correspondence between the matching identifier and the second profile; and
a receiving module 10014, configured to receive the second OS identifier sent by the server, where the second OS identifier is determined by the server from the OS identifier list based on the matching identifier.

Optionally, the sending unit 1003 is further configured to send the second OS identifier to the server; and the second obtaining unit 1004 is further configured to: when the server stores remote profile management RPM information corresponding to the second OS identifier, obtain the RPM information from the server, where the RPM information is used to manage the second profile.

Figure 11:
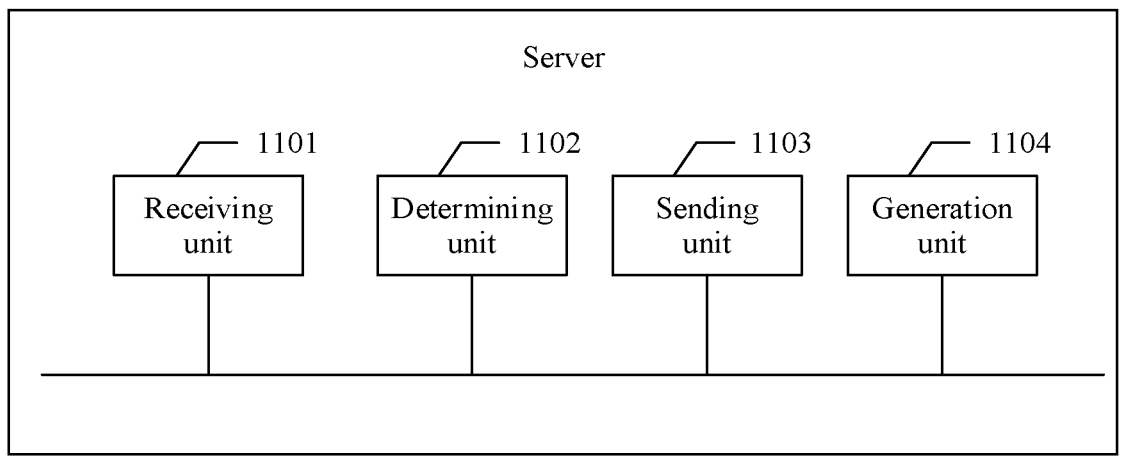
FIG. 11 is a schematic diagram of an embodiment of a server according to this application.

As shown in FIG. 11, in an embodiment of a server in this application, the server includes at least the following function modules:

a receiving unit 1101, configured to receive a target message sent by a terminal, where the target message is generated after the terminal switches to a second OS based on a second OS identifier, the second OS identifier is obtained when the terminal runs a first OS, and the second OS identifier matches a second profile;

a determining unit 1102, configured to determine the second profile based on the target message; and a sending unit 1103, configured to send the second profile to the terminal.

Optionally, the server may further include:

A generation unit 1104, configured to generate an activation code based on the second OS identifier.

Optionally, the receiving unit 1101 is further configured to receive an OS identifier list and a matching identifier that are sent by the terminal, where there is a unique correspondence between the matching identifier and the second profile.

The determining unit 1102 is further configured to determine the second OS identifier from the OS identifier list based on the matching identifier.

The sending unit 1103 is further configured to send the second OS identifier to the terminal.

Optionally, the receiving unit 1101 is further configured to receive the second OS identifier sent by the terminal.

The sending unit 1103 is further configured to: when the server stores remote profile management RPM information corresponding to the second OS identifier, send the RPM information to the terminal, where the RPM information is used to manage the second profile.

Figure 12:
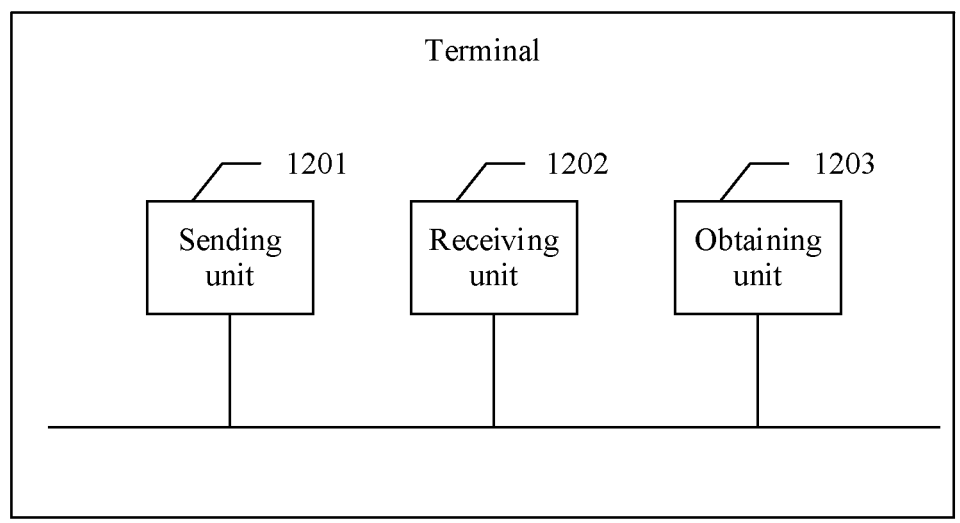
FIG. 12 is a schematic diagram of another embodiment of a terminal according to this application.

As shown in FIG. 12, in another embodiment of a terminal in this application, the terminal includes at least the following function modules:

a sending unit 1201, configured to send a first message to a server, where the first message is used to request a bundle from the server, and the bundle includes an operating system OS file and a profile profile;

a receiving unit 1202, configured to receive a bundle identifier sent by the server; and an obtaining unit 1203, configured to: when the bundle identifier matches a rules authorization table RAT preset on the terminal, obtain the OS file and the profile from the server.

Figure 13:
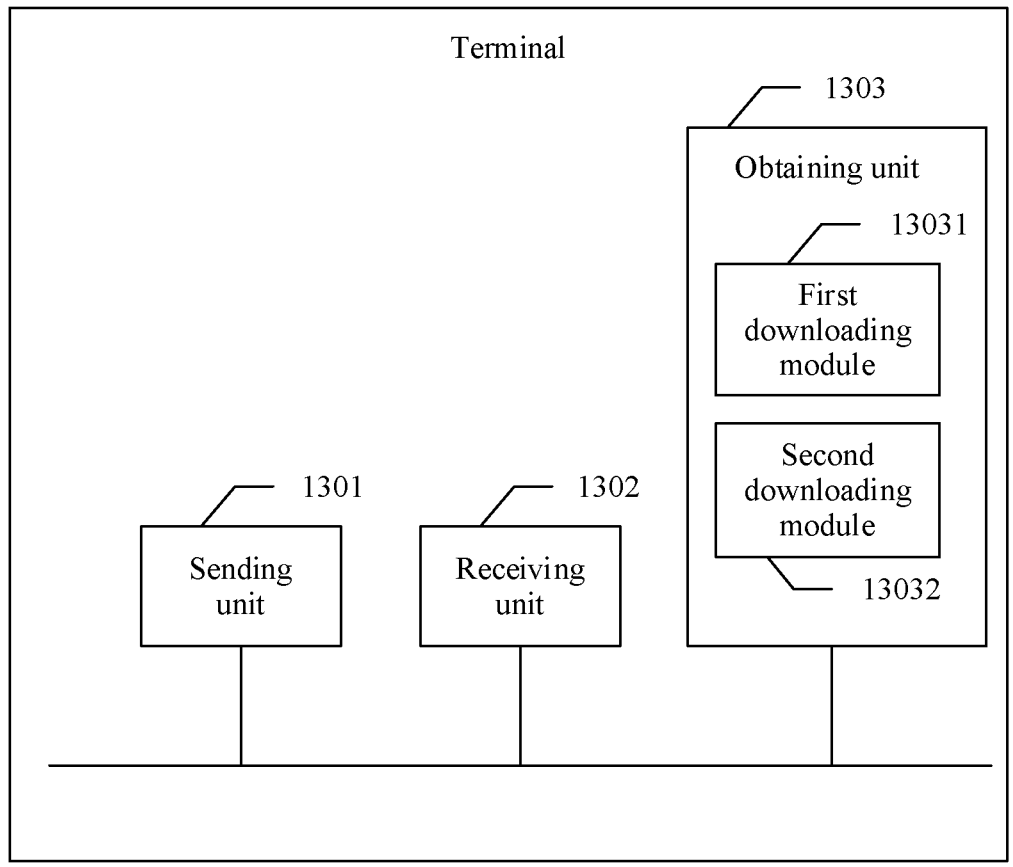
FIG. 13 is a schematic diagram of another embodiment of a terminal according to this application.

As shown in FIG. 13, in some specific embodiments, a sending unit 1301, a receiving unit 1302, and an obtaining unit 1303 are configured. Actions performed by the units are similar to actions performed by the units shown in FIG. 12. Details are not described herein again.

Optionally, the sending unit 1301 is further configured to send a bundle identifier list to the server, where the bundle identifier is determined by the server based on the bundle identifier list.

Optionally, the obtaining unit 1303 includes:

a first downloading module 13031, configured to download the OS file from the server to a first security domain, where the first security domain is configured by the server; and a second downloading module 13032, configured to download the profile from the server to a second security domain, where the second security domain is configured by the server.

Figure 14:
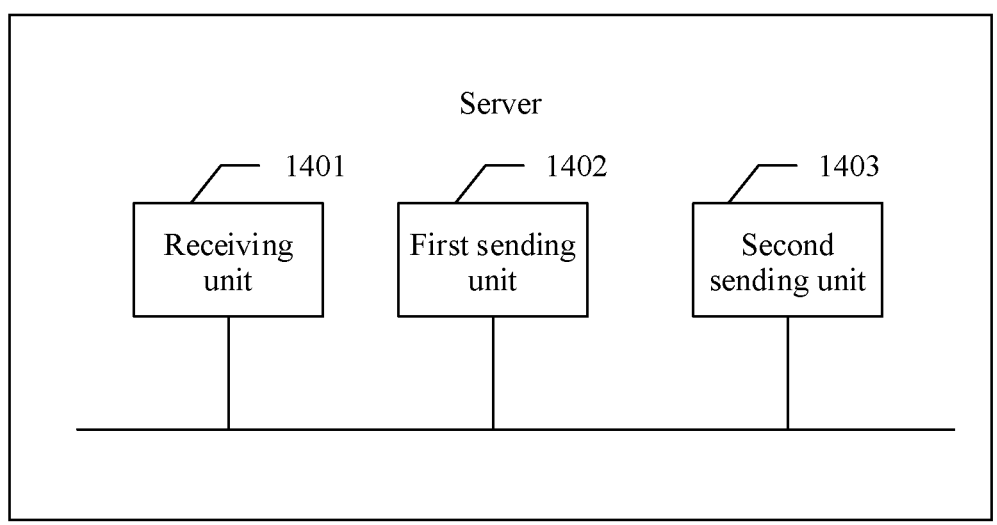
FIG. 14 is a schematic diagram of another embodiment of a server according to this application.

As shown in FIG. 14, in another embodiment of a server in this application, the server includes at least the following function modules:

a receiving unit 1401, configured to receive a first message sent by a terminal, where the first message is used to request a bundle from the server, and the bundle includes an operating system OS file and a profile profile;

a first sending unit 1402, configured to send a bundle identifier to the terminal; and a second sending unit 1403, configured to: when the bundle identifier matches a rules authorization table RAT preset on the terminal, send the OS file and the profile to the terminal.

Figure 15:
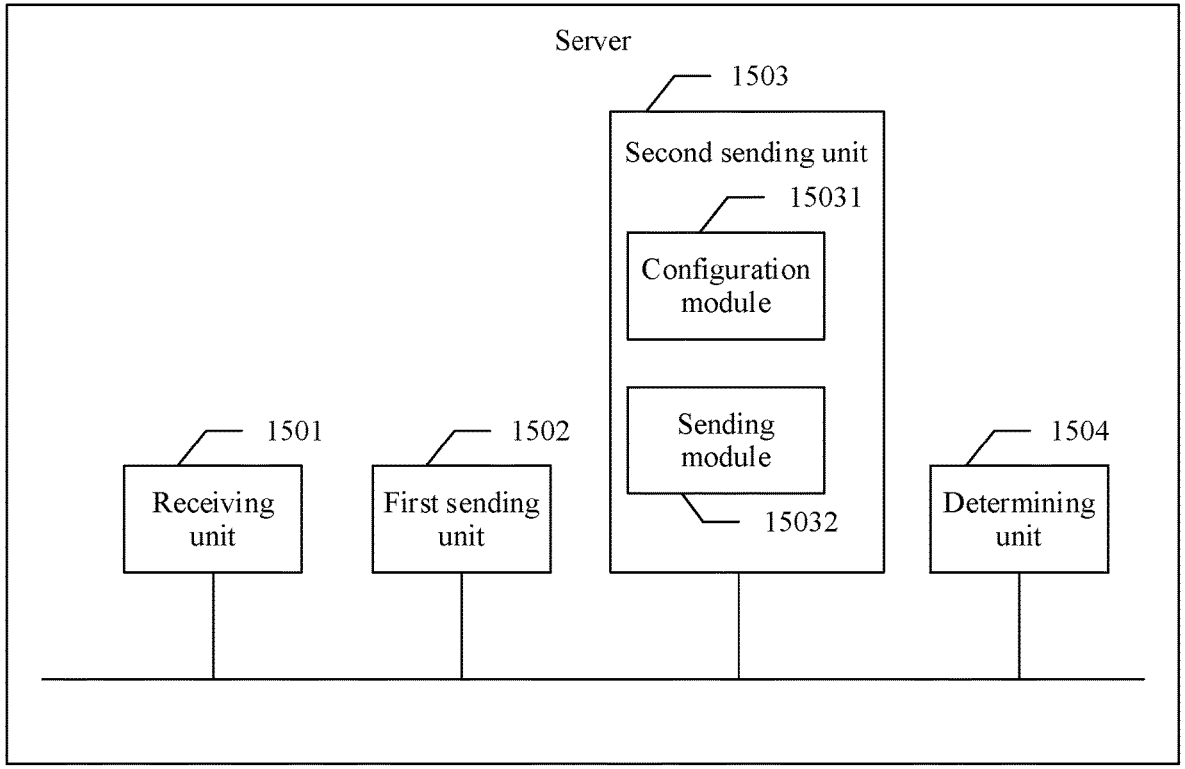
FIG. 15 is a schematic diagram of another embodiment of a server according to this application.

As shown in FIG. 15, in some specific embodiments, a receiving unit 1501, a first sending unit 1502, and a second sending unit 1503 are configured. Actions performed by the units are similar to actions performed by the units shown in FIG. 14. Details are not described herein again.

Optionally, the receiving unit 1501 is further configured to receive a bundle identifier list sent by the terminal.

The server further includes:

a determining unit 1504, configured to determine the bundle identifier based on the bundle identifier list.

Optionally, the second sending unit 1503 includes:

a configuration module 15031, configured to configure a first security domain and a second security domain; and a sending module 15032, configured to send the OS file to the first security domain, and send the profile to the second security domain.

Figure 16:
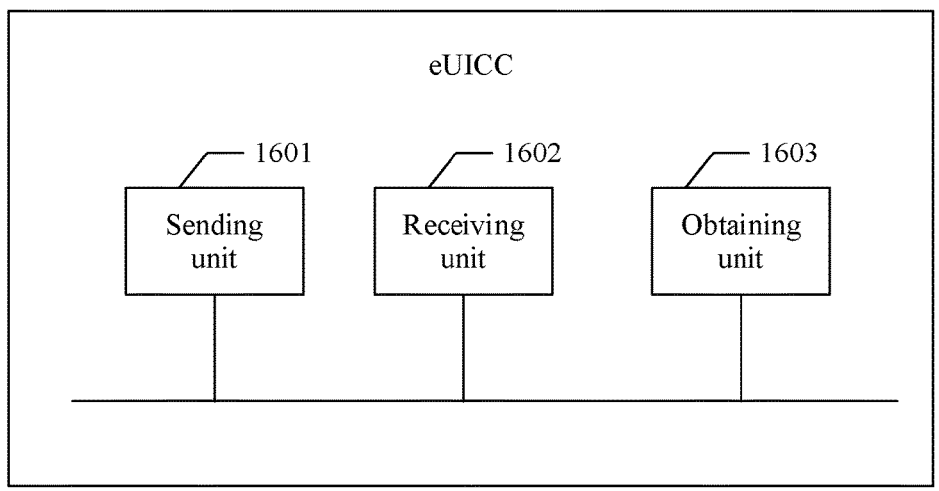
FIG. 16 is a schematic diagram of an embodiment of an eUICC according to this application.

As shown in FIG. 16, in an embodiment of an eUICC of this application, the eUICC includes at least the following function modules:

a sending unit 1601, configured to: when the eUICC runs a first operating system OS, send first version information of a first issuer security domain root ISD-R corresponding to the first OS to a primary platform PP;

a receiving unit 1602, configured to: when the eUICC runs a second operating system OS, receive the first version information sent by the PP; and an obtaining unit 1603, configured to: if the first version information does not match second version information of a second ISD-R corresponding to the second OS, obtain data information corresponding to the second version information, where the data information is used to update the second ISD-R.

Figure 17:
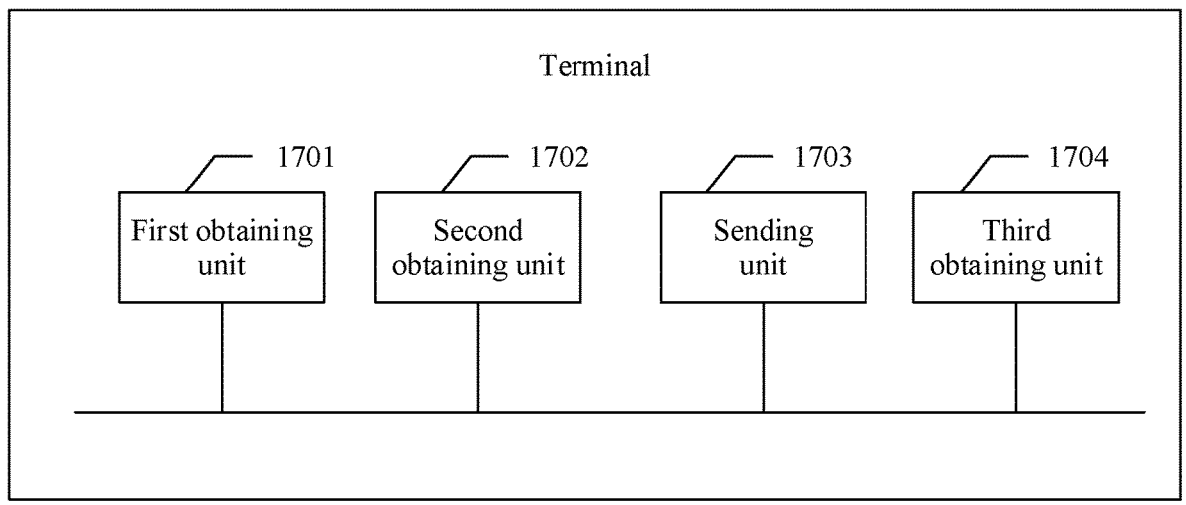
FIG. 17 is a schematic diagram of another embodiment of a terminal according to this application.

As shown in FIG. 17, in another embodiment of a terminal in this application, the terminal includes at least the following function modules:

a first obtaining unit 1701, configured to: when the terminal runs a first operating system OS, obtain a second OS identifier, where the second OS identifier matches a second profile;

a second obtaining unit 1702, configured to obtain a key from a second OS, where the second OS is determined by the terminal based on the second OS identifier;

a sending unit 1703, configured to send the key to a server; and a third obtaining unit 1704, configured to: when the server determines that the key is verified successfully, obtain the second profile from the server.

Figure 18:
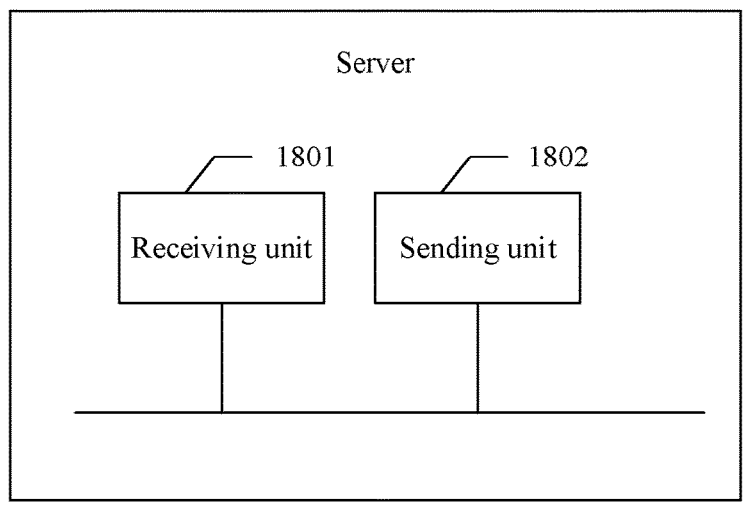
FIG. 18 is a schematic diagram of another embodiment of a server according to this application.

As shown in FIG. 18, in another embodiment of a server in this application, the server includes at least the following function modules:

a receiving unit 1801, configured to receive a key sent by a terminal, where the key is obtained by the terminal from a second OS, the second OS is determined by the terminal based on a second OS identifier, the second OS identifier is obtained when the terminal runs a first OS, and the second OS identifier matches a second profile; and a sending unit 1802, configured to: when the server successfully verifies the key, send the second profile to the terminal.

The foregoing describes the server and the terminal in the embodiments of this application from a perspective of a modular functional entity. The following describes the server and the terminal in the embodiments of this application from a perspective of hardware processing.

Figure 19:
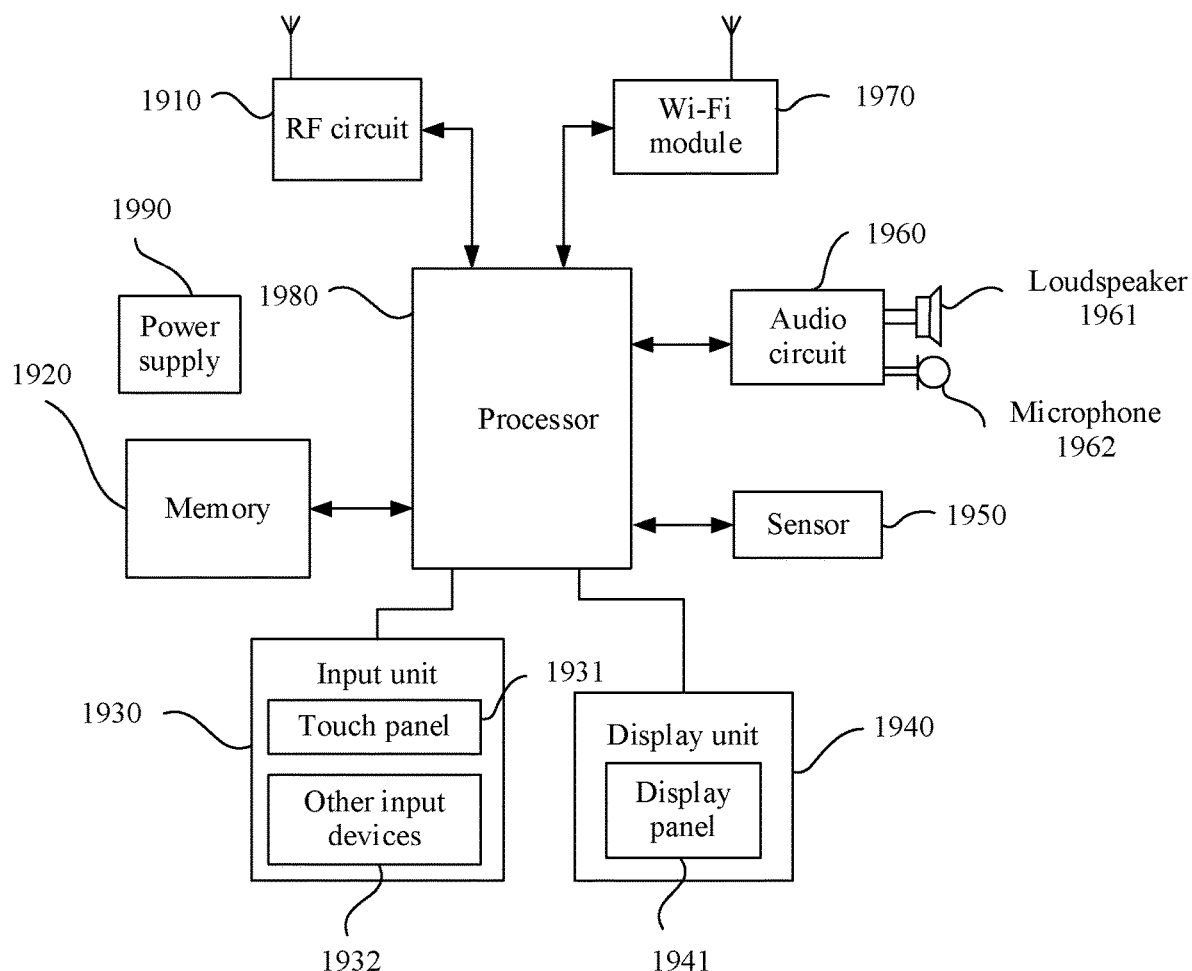
FIG. 19 is a schematic structural diagram of a terminal according to this application.

As shown in FIG. 19, an embodiment of this application further provides a terminal. For ease of description, only a part related to this embodiment of this application is illustrated. For specific technical details that are not disclosed, refer to the method part in the embodiments of this application. The terminal may be any terminal device including a mobile phone, a tablet computer, a personal digital assistant (PDA), a point of sales (POS), a vehicle-mounted computer, or the like. For example, the terminal is a mobile phone.

FIG. 19 is a block diagram of a partial structure of a mobile phone related to the terminal according to this embodiment of this application. Referring to FIG. 19, the mobile phone includes components such as a radio frequency (RF) circuit 1910, a memory 1920, an input unit 1930, a display unit 1940, a sensor 1950, an audio circuit 1960, a wireless fidelity (Wi-Fi) module 1970, a processor 1980, and a power supply 1990. A person skilled in the art may understand that the structure of the mobile phone shown in FIG. 19 does not constitute a limitation on the mobile phone, and the mobile phone may include more or fewer components than those shown in the figure, or combine some components, or have different component arrangements.

The following describes the constituent components of the mobile phone in detail with reference to FIG. 19.

The RF circuit 1910 may be configured to receive and send a signal in an information receiving and sending process or a call process. In particular, after receiving downlink information from a base station, the RF circuit 1910 sends the downlink information to the processor 1980 for processing. In addition, the RF circuit 1910 sends related uplink data to the base station. Generally, the RF circuit 1910 includes but is not limited to an antenna, at least one amplifier, a transceiver, a coupler, a low noise amplifier (LNA), a duplexer, and the like. In addition, the RF circuit 1910 may further communicate with a network and another device through wireless communication. Any communications standard or protocol may be used for the wireless communication, and includes but is not limited to a global system for mobile communications (GSM), a general packet radio service (GPRS) system, a code division multiple access (CDMA) system, a wideband code division multiple access (WCDMA) system, a long term evolution (LTE) system, an email, a short message service (SMS), and the like.

The memory 1920 may be configured to store a software program and a module. The processor 1980 performs various function applications of the mobile phone and processes data by running the software program and the module that are stored in the memory 1920. The memory 1920 may mainly include a program storage area and a data storage area. The program storage area may store an operating system, an application program required by at least one function (such as a sound play function and an image play function), and the like. The data storage area may store data (such as audio data and a phone book) created based on use of the mobile phone, and the like. In addition, the memory 1920 may include a high speed random access memory, and may further include a nonvolatile memory, for example, at least one magnetic disk storage device, a flash memory, or another volatile solid-state storage device.

The input unit 1930 may be configured to receive entered digital or character information, and generate a key signal input related to user settings and function control of the mobile phone. Specifically, the input unit 1930 may include a touch panel 1931 and other input devices 1932. The touch panel 1931, also referred to as a touchscreen, may collect a touch operation performed by the user on or near the touch panel 1931 (for example, an operation performed by the user on the touch panel 1931 or near the touch panel 1931 by using any suitable object or accessory such as a finger or a stylus), and may drive a corresponding connection apparatus according to a preset program. Optionally, the touch panel 1931 may include two parts: a touch detection apparatus and a touch controller. The touch detection apparatus detects a touch direction and position of the user, detects a signal brought by the touch operation, and transmits the signal to the touch controller. The touch controller receives touch information from the touch detection apparatus, converts the touch information into touch point coordinates, then sends the touch point coordinates to the processor 1980, and receives and executes a command sent by the processor 1980. In addition, the touch panel 1931 may be implemented in a plurality of types, such as a resistive type, a capacitive type, an infrared type, and a surface acoustic wave type. In addition to the touch panel 1931, the input unit 1930 may further include other input devices 1932. Specifically, the other input devices 1932 may include but are not limited to one or more of a physical keyboard, a function button (such as a volume control key or an on/off key), a trackball, a mouse, and a joystick.

The display unit 1940 may be configured to display information entered by a user or information provided for a user, and various menus of the mobile phone. The display screen 1940 may include a display panel 1941. Optionally, the display panel 1941 may be configured in a form of a liquid crystal display (LCD), an organic light-emitting diode (OLED), or the like. Further, the touch panel 1931 may cover the display panel 1941. After the touch panel 1931 detects a touch operation on or near the touch panel 1931, the touch operation is transmitted to the processor 1980 to determine a type of a touch event. Then, the processor 1980 provides corresponding visual output on the display panel 1941 based on the type of the touch event. Although the touch panel 1931 and the display panel 1941 are used as two independent parts in FIG. 19 to implement input and input functions of the mobile phone, in some embodiments, the touch panel 1931 and the display panel 1941 may be integrated to implement the input and output functions of the mobile phone.

The mobile phone may further include at least one sensor 1950 such as a light sensor, a motion sensor, and another sensor. Specifically, the light sensor may include an ambient light sensor and a proximity sensor. The ambient light sensor may adjust luminance of the display panel 1941 based on brightness of ambient light. The proximity sensor may turn off the display panel 1941 and/or backlight when the mobile phone moves to an ear. As a type of movement sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may be further configured in the mobile phone. Details are not described herein.

The audio circuit 1960, a speaker 1961, and a microphone 1962 may provide an audio interface between the user and the mobile phone. The audio circuit 1960 may convert received audio data into an electrical signal, and then transmit the electrical signal to the loudspeaker 1961, and the loudspeaker 1961 converts the electrical signal into a sound signal for output. In addition, the microphone 1962 converts a collected sound signal into an electrical signal. The audio circuit 1960 receives the electrical signal, converts the electrical signal into audio data, and then outputs the audio data to the processor 1980 for processing. After the processing, the processor 1980 sends the audio data to, for example, another mobile phone, by using the RF circuit 1910, or outputs the audio data to the memory 1920 for further processing.

Wi-Fi is a short-distance wireless transmission technology. With the Wi-Fi module 1970, the mobile phone may help the user send and receive an email, browse a web page, access streaming media, and the like. The Wi-Fi module 1970 provides wireless access to the broadband interne for the user. Although FIG. 19 shows the Wi-Fi module 1970, it may be understood that the Wi-Fi module 1970 is not a mandatory component of the mobile phone, and may be omitted based on a requirement without changing the essence of this application.

The processor 1980 is a control center of the mobile phone, connects various parts of the entire mobile phone by using various interfaces and lines, and performs various functions of the mobile phone and processes data by running or executing a software program and/or a module that are/is stored in the memory 1920 and by invoking data stored in the memory 1920, to perform overall monitoring of the mobile phone. Optionally, the processor 1980 may include one or more processing units. Preferably, an application processor and a modem processor may be integrated into the processor 1980. The application processor mainly processes an operating system, a user interface, an application, and the like. The modem processor mainly processes wireless communication. It may be understood that the foregoing modem processor may not be integrated into the processor 1980.

The mobile phone further includes the power supply 1990 (such as a battery) supplying power to each component. Preferably, the power supply may be logically connected to the processor 1980 by using a power management system, to implement functions such as charging, discharging, and power consumption management by using the power management system.

Although not shown, the mobile phone may further include a camera, a Bluetooth module, and the like. Details are not described herein.

In this embodiment of this application, the processor 1980 is specifically configured to perform all or some of actions performed by the terminal in the embodiments shown in FIG. 2 to FIG. 8. Details are not described herein again.

Figure 20:
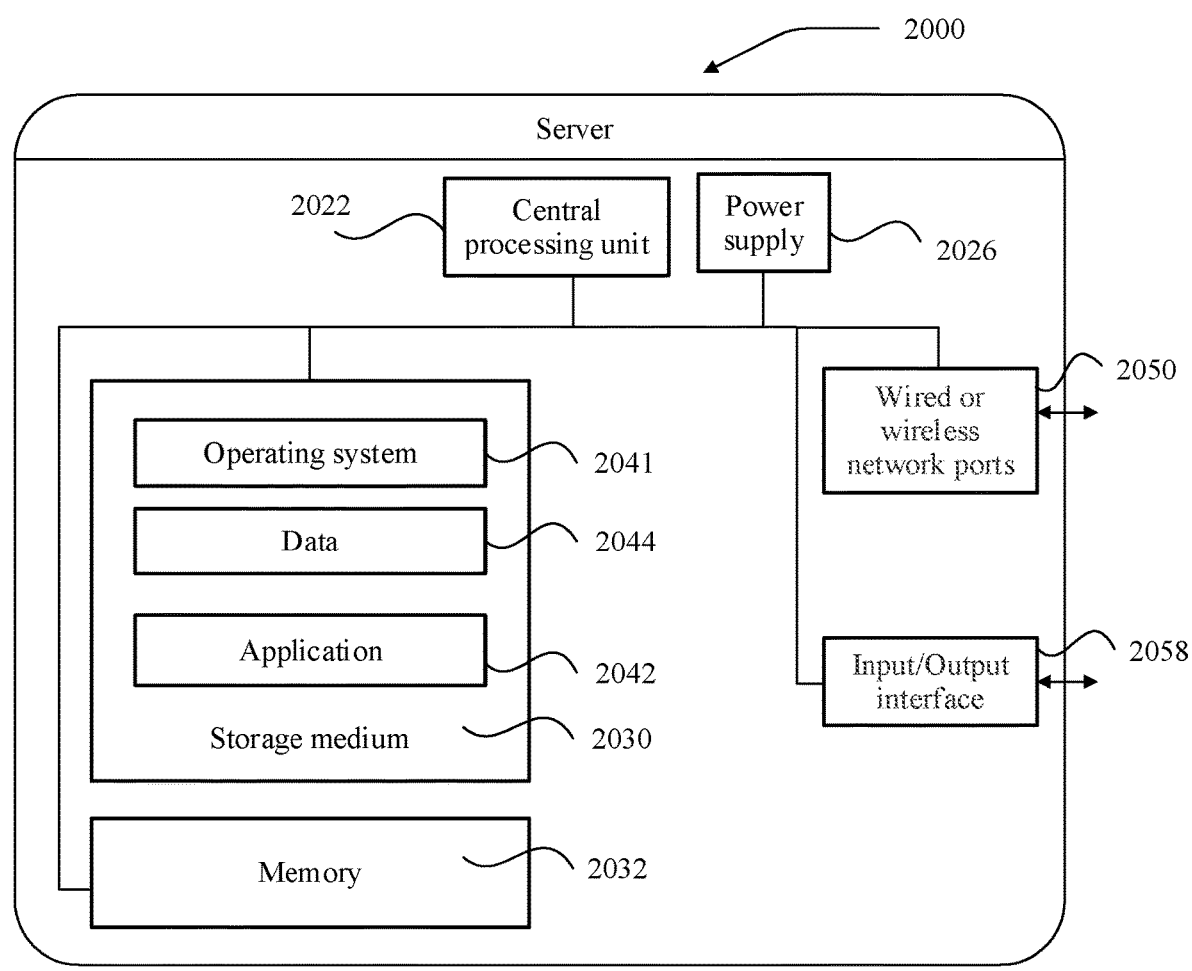
FIG. 20 is a schematic structural diagram of a server according to this application.

FIG. 20 is a schematic structural diagram of a server according to an embodiment of this application. The server 2000 may have a relatively large difference due to different configurations or performance, and may include one or more central processing units (CPU) 2022 (for example, one or more processors), a memory 2032, and one or more storage media 2030 (for example, one or more mass storage devices) that store an application program 2042 or data 2044. The memory 2032 and the storage medium 2030 may be used for temporary storage or permanent storage. A program stored in the storage medium 2030 may include at least one module (not shown in the figure), and each module may include a series of instruction operations for the server. Further, the central processing unit 2022 may be configured to communicate with the storage medium 2030, to perform, on the server 2000, a series of instruction operations in the storage medium 2030.

The central processing unit 2022 may perform, according to the instruction operation, all or some actions performed by the server (including the SM-DP+ server, the MNO server, the SM-DS server, and the update server) in the embodiments shown in FIG. 2 to FIG. 8. Details are not described herein again.

The server 2000 may further include one or more power supplies 2026, one or more wired or wireless network interfaces 2050, one or more input/output interfaces 2058, and/or one or more operating systems 2041 such as Windows Server™, Mac OS X™, Unix™, Linux™, and FreeBSD™.

Operations performed by the server in the foregoing embodiments may be based on the server structure shown in FIG. 20.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, people of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A profile transmission method, comprising:
   when a terminal runs a first operating system (OS), obtaining, by a terminal, a second OS identifier, wherein a first profile is installed on the first OS, wherein the first profile is provided by a first operator to run on the first OS, wherein the second OS identifier matches a second profile, wherein the second profile is provided by a second operator to run on the second OS, wherein the obtaining, by the terminal, the second OS identifier comprises:
      sending, by the terminal, an OS identifier list and a matching identifier to a server, wherein there is a unique correspondence between the matching identifier and the second profile, and
      receiving, by the terminal, the second OS identifier sent by the server, wherein the second OS identifier is determined by the server from the OS identifier list based on the matching identifier;
   switching, by the terminal, to a second OS based on the second OS identifier;
   sending, by the terminal, a target message to the server, wherein the target message requests the second profile; and
   obtaining, by the terminal, the second profile from the server.

2. The profile transmission method according to claim 1, wherein the obtaining, by the terminal, the second OS identifier comprises:
   obtaining, by the terminal, an activation code, wherein the activation code is generated by the server based on the second OS identifier; and
   extracting, by the terminal, the second OS identifier from the activation code.

3. The profile transmission method according to claim 1, wherein after the obtaining, by the terminal, the second profile from the server, the profile transmission method further comprises:
   sending, by the terminal, the second OS identifier to the server; and
   when the server stores remote profile management RPM information corresponding to the second OS identifier, obtaining, by the terminal, the RPM information from the server, wherein the RPM information is used to manage the second profile.

4. A terminal, comprising:
   a processor;
   a memory coupled to the processor and storing program instructions, which, when executed by the processor, cause the terminal to perform operations comprising:
      when the terminal runs a first operating system (OS), obtaining a second OS identifier, wherein a first profile is installed on the first OS, wherein the first profile is provided by a first operator to run on the first OS, wherein the second OS identifier matches a second profile, wherein the second profile is provided by a second operator to run on the second OS, wherein the obtaining, by the terminal, the second OS identifier comprises:
         sending, by the terminal, an OS identifier list and a matching identifier to a server, wherein there is a unique correspondence between the matching identifier and the second profile, and
         receiving, by the terminal, the second OS identifier sent by the server, wherein the second OS identifier is determined by the server from the OS identifier list based on the matching identifier;
      switching to a second OS based on the second OS identifier;
      sending a target message to the server, wherein the target message requests the second profile; and
      obtaining the second profile from the server.

5. The terminal according to claim 4, wherein the operations further comprise:
   obtaining an activation code, wherein the activation code is generated by the server based on the second OS identifier; and
   extracting the second OS identifier from the activation code.

6. The terminal according to claim 4, wherein the operations further comprise:
   sending the second OS identifier to the server; and
   when the server stores remote profile management RPM information corresponding to the second OS identifier, obtaining the RPM information from the server, wherein the RPM information is used to manage the second profile.

7. A non-transitory computer-readable storage medium storing program instructions, which, which executed by a processor of a terminal, cause the terminal to perform operations comprising:
   when a terminal runs a first operating system (OS), obtaining a second OS identifier, wherein a first profile is installed on the first OS, wherein the first profile is provided by a first operator to run on the first OS, wherein the second OS identifier matches a second profile, wherein the second profile is provided by a second operator to run on the second OS, wherein the obtaining, by the terminal, the second OS identifier comprises:
      sending, by the terminal, an OS identifier list and a matching identifier to a server, wherein there is a unique correspondence between the matching identifier and the second profile, and
      receiving, by the terminal, the second OS identifier sent by the server, wherein the second OS identifier is determined by the server from the OS identifier list based on the matching identifier;
   switching to a second OS based on the second OS identifier;
   sending a target message to the server, wherein the target message requests the second profile; and
   obtaining the second profile from the server.

8. The non-transitory computer-readable storage medium of claim 7, wherein the obtaining the second OS identifier comprises:

obtaining an activation code, wherein the activation code is generated by the server based on the second OS identifier; and extracting, the second OS identifier from the activation code.

9. The non-transitory computer-readable storage medium of claim 7, wherein after the obtaining the second profile from the server, the operations further comprise:

sending the second OS identifier to the server; and when the server stores remote profile management RPM information corresponding to the second OS identifier, obtaining, the RPM information from the server, wherein the RPM information is used to manage the second profile.

* * * * *